United States Patent

Thompson

[15] 3,649,763

[45] Mar. 14, 1972

[54] TIME DIVISION SWITCHING SYSTEM

[72] Inventor: John Stewart Thompson, Sea Bright, N.J.

[73] Assignee: Bell Telephone Laboratories, Incorporated, Murray Hill, N.J.

[22] Filed: May 27, 1970

[21] Appl. No.: 40,882

[52] U.S. Cl. ....................179/15 AQ

[51] Int. Cl. ....................H04j 3/00

[58] Field of Search ..........179/15 AQ, 15 AT, 18 ES, 18 J

[56] References Cited

UNITED STATES PATENTS

| | | | |
|---|---|---|---|
| 3,461,242 | 8/1969 | Inose | 179/15 AQ |
| 3,458,659 | 7/1969 | Sternung | 179/15 AQ |
| 3,458,658 | 7/1969 | Aro | 179/15 AQ |
| 3,439,124 | 4/1969 | Dupieux | 179/15 AT |
| 3,236,951 | 2/1966 | Yamamoto | 179/15 AQ |

*Primary Examiner*—Kathleen H. Claffy
*Assistant Examiner*—David L. Stewart
*Attorney*—R. J. Guenther and Kenneth B. Hamlin

[57] ABSTRACT

Control memories actuate space division switching matrices to connect plural time division multiplex lines to different input and output connections of time slot unit storage locations for performing plural time slot interchange functions simultaneously and independently in different portions of the locations. In two embodiments the locations are in a dynamic form as the respective stages of a reentrant shift register and the respective locations in a circulating delay line. In another embodiment the locations are in a static form as the respective memory devices in a random access memory. In any embodiment status and compare circuits evaluate storage location control signals for finding an available path of suitable length in the time-storage domain of the locations for establishing new connections between calling and called lines.

26 Claims, 16 Drawing Figures

INVENTOR
J. S. THOMPSON
BY
Charles Scott Phelan
ATTORNEY

PATENTED MAR 14 1972

3,649,763

SHEET 13 OF 13

TIME DIVISION SWITCHING SYSTEM

BACKGROUND OF THE INVENTION

1. Field of the Invention

This invention relates to a time division multiplex switching system employing time slot interchange operations for time division switching.

2. Prior Art

In time division multiplex systems, it is known to switch messages, or calls, from one time division multiplex line to another by time slot interchange techniques which do not require demultiplexing, switching, and subsequent remultiplexing. In the time slot interchange process, each time slot unit of message information is delayed to the extent necessary to permit it to be transmitted onward toward the called party in the next succeeding set of called party equipment. Usually dynamic storage in the form of shift registers or delay lines is employed, on the basis of a message frame of storage per line, for delaying time slot units of message information from a calling time slot to a called time slot. The storage is controlled by memories which actuate space division switching arrangements during the correct time slots in each frame of time division multiplex signal transmission and thereby couple each time division multiplex line as may be necessary to store or to read out the appropriate information unit for a particular time slot.

Shift register or delay line structures have been utilized for time slot interchange between a single input line and a single output line, and for switching among plural time division multiplex lines on a fanout basis. When it is desired to accommodate simultaneous time slot interchange for plural sets of calling and called time division multiplex lines, plural shift registers are employed in combination with space division switching matrices. Each shift register includes a number of stages which is necessarily equal to the number of time slots in a time division multiplex frame of message transmission, and a number of shift registers is employed which is at least equal to the number of time division multiplex lines to be accommodated. Each stage has a message signal storage capacity sufficient to store one time slot unit of signal. It has been found, however, that in time division multiplex systems the delay most often needed between calling and called time slots is much less than a full frame of time slots. Thus, prior time division switching systems have avoided the possibility of erroneously overwriting message signals being delayed by providing a great deal of shift register hardware and associated control memory and other circuitry even though they are not often fully and efficiently utilized.

It is, therefore, one object of the present invention to reduce the hardware requirements for time slot delay circuits in time slot interchangers for time division multiplex switching while at the same time retaining or improving the blocking probability characteristic of the system.

STATEMENT OF THE INVENTION

As a solution to the foregoing hardware utilization efficiency problem, the present invention employs plural time slot unit storage locations having individual input and output connections which are available to every time division multiplex line in every time slot so that plural time slot interchange delay functions can be simultaneously and independently carried out therein.

It is one feature of the invention that storage locations which are unused by a call during any particular time slot are independently available to any time division multiplex line during those time slots, and common logic circuits are provided for finding in the time-storage domain an available time-location sequence which is suitable for a new switching connection.

In one illustrative embodiment of the invention dynamic time slot delay storage is provided in the form of a reentrant shift register wherein each shift register stage is a different one of the time slot unit storage locations.

In another illustrative embodiment of the invention static storage is employed in the form of a random access memory wherein each addressable memory location is a different one of the time slot unit storage locations.

BRIEF DESCRIPTION OF THE DRAWINGS

A more complete understanding of the invention may be obtained from a consideration of the following detailed description when taken together with the appended claims and the attached drawings in which:

DETAILED DESCRIPTION

Figure 1:
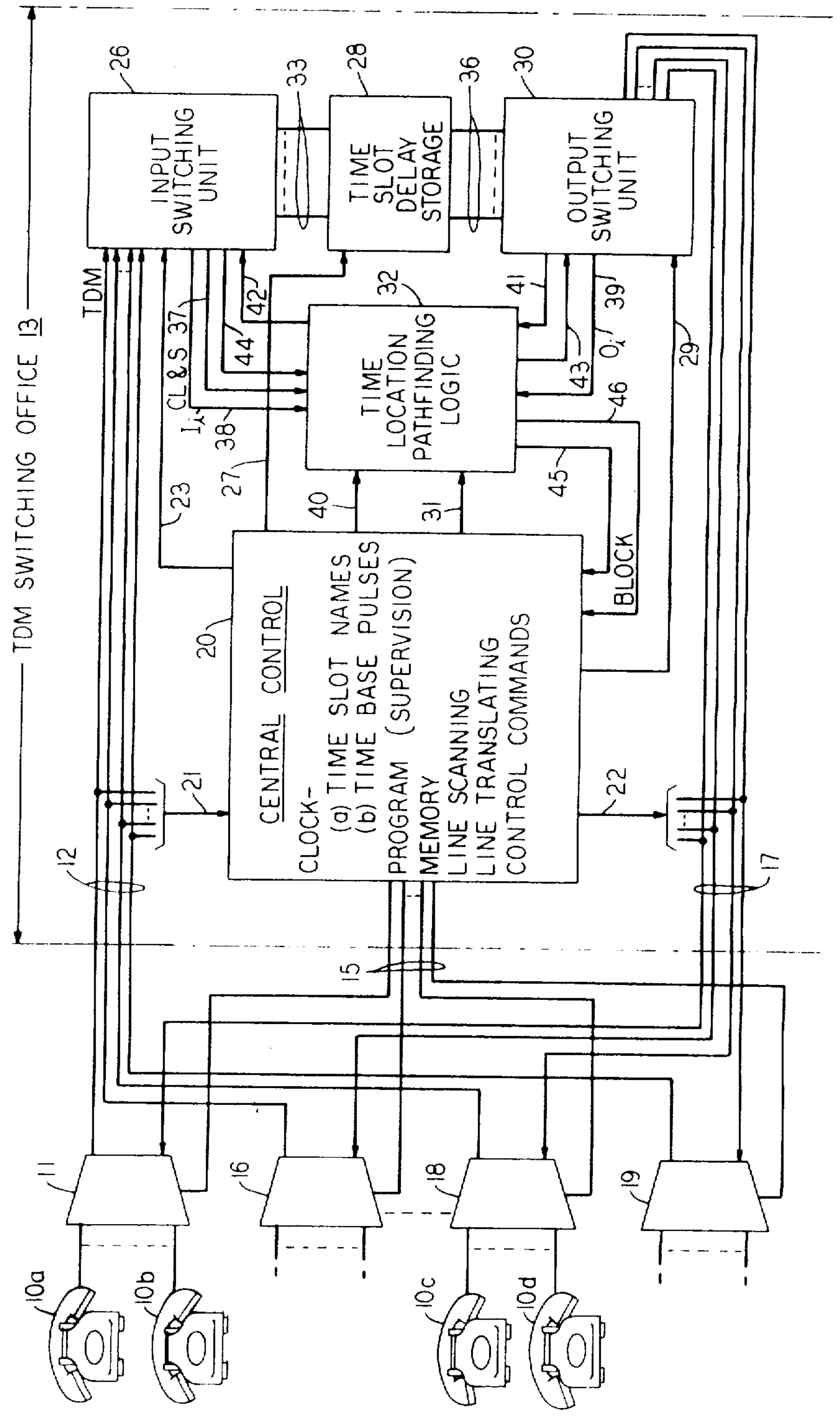
FIG. 1 is a simplified block and line diagram of a time division multiplex switching system in accordance with the invention.

FIG. 1 is a simplified time division multiplex switching system utilizing the present invention. The system is operated for selectively interconnecting a plurality of subscribers such as telephone subscribers 10*a*, 10*b*, 10*c* and 10*d*. Line concentrators 11, 16, 18, and 19 sample message signals from respective groups of subscribers, e.g., 10*a* and 10*b* for concentrator 11 and 10*c* and 10*d* for concentrator 18. For convenience of illustration only four subscribers on two of the four concentrators are shown, but operation with many more concentrators and subscribers per concentrator can be achieved with the present invention. Those analog samples in a concentrator are advantageously translated to a pulse code modulated form and applied on a time division multiplex basis to an individual, transmitting, space-divided channel such as one of the time division lines 12 for the respective concentrators. The latter lines couple the time division message signals to a time division multiplex switching office 13. The lines 12 are hereinafter considered to be input time division lines for office 13. A further group of lines 17 comprise receiving time division lines for concentrators 11, 16, 18, and 19, respectively; and are hereinafter considered output lines for office 13. Any of the aforementioned time division lines may, instead of serving a line concentrator as shown, serve as a time division multiplex link to other equipment, such as different time slot interchangers or different switching offices, in a manner which will be subsequently briefly discussed for plural time slot interchangers.

Each line concentrator is advantageously of a type somewhat modified from concentrators heretofore often used in the art. Each transmitting subscriber served by a concentrator has, as usual, a specific time slot assigned by central control for transmitting on a given call. However, the subscriber's reception is not restricted to the same time slot because for the same call he can receive during any time slot dictated by the office 13. Control from office 13 is exercised by way of control lines 15 in a manner known in the art. Such a concentrator is shown in more detail in FIG. 14 herein. It is to be understood that other forms of concentrator can also be employed but may realize the benefits of the invention to a different degree depending upon the full nature of the application involved.

It is sufficient for purposes of teaching the present invention to deal primarily with a single direction of transmission, it being understood that similar techniques are used to establish circuits for transmission in the opposite direction between the same calling and called parties. In the system depicted in FIG. 1 the equipment in office 13 detects the input line and time slot numbers used by a party seeking to make a call, finds a free time slot for transmission on the output line to the called party desired, and establishes a time slot interchange connection between those lines. This establishes the talking, or transmitting, path from calling party to called party. Next the office identifies the transmitting time slot of the called party and establishes a listening time slot interchange path back to the calling party.

Within office 13 a central control 20 is provided for automatically managing the operation of the office 13. Such management is usually exercised in accordance with data processing techniques now well known in the art and wherein the central control 20 is a stored program controlled processor. A few of the central control functions will be mentioned. Thus, the central control applies, for its own use and for use throughout the office, clock signals in the form of time base pulses, some recurring at the time slot rate and others at the same or other rates in different phase relations. Other clock signals are provided in the form of recurring trains of binary coded time slot name words occurring at a word repetition rate which is equal to the time slot recurrence rate for the system and named according to the numerical sequence of each time slot in a frame. Time base pulses occurring at the time slot rate and phase are hereinafter called "time slot pulses." Time base pulses occurring in different phases are called "time slot phase pulses." Time slot name trains are called "-time slot clock." Central control 20 also includes memory facilities for permanent program storage as well as for the storage of temporary and permanent data and temporary instruction information. Sequencing circuits are also included in the central control 20 for producing the necessary control commands to various office units in response to the decoding of programmed instructions.

One of the functions included in central control 20 is a line scanning function for supervisory purposes, and to this end a connection 21 is provided from input time division highways 12 to the central control 20. A further connection 22 to output time division highways 17 supplies control signals in a dedicated time slot to remote concentrators. This function is performed in cooperation with the similar function of the dedicated control lines 15. The extent to which either technique or both techniques are employed depends upon design convenience in the particular system application. Details of the scanning, and related supervisory functions of securing, storing, and using individual subscriber-related information are not here presented because they are well known for time division switching systems and are not necessary to an understanding of the present invention.

Outputs from central control 20 include signals provided on a connection 23 for controlling an input switching unit 26, signals on a connection 27 for controlling time slot delay storage 28, signals on a connection 29 for controlling an output switching unit 30, and signals on a connection 31 for controlling time-location pathfinding logic 32. Units 26 and 30 cooperate with storage 28 for interconnecting time division lines by time slot interchange techniques.

Time slot delay storage 28 includes plural time slot unit storage locations to which the input switching unit 26 supplies time slot units of message signal at appropriate time slots. During each time slot each of the individual storage locations in the delay storage 28 can be connected to receive time slot unit signals from any incoming time division line 12 by way of input circuits 33. Similarly, output circuits 36 receive appropriately delayed message signals from individual storage locations in delay storage 28 and are connected to individual output time division lines 17 by the output switching unit 30. A time slot unit of message signal can be a single binary code bit representation or a group of such bits depending upon system organization as is known in the art. However, in the present application the discussion is presented in terms of a time slot unit of message signal which includes only a single binary code bit.

In accordance with one aspect of the present invention the delay storage 28 includes far less storage locations than are normally found in time division switching systems of the prior art since those locations are individually available during each time slot to each input and output time division line. Consequently, pathfinding logic 32 is included in the office 13 for indicating, in a manner which will be subsequently described, the availability of various storage locations in delay storage 28 in respective time slots that are of interest for the establishment of new connections between calling and called subscribers and their respective time division multiplex lines in calling and called time slots, respectively, available on those lines. For convenience of description, this type of pathfinding logic operation is generally indicated as finding in the time-storage domain for delay storage 28 a time-location sequence which is available for establishing new connections without overwriting, or being overwritten by, other message signals applied to storage 28.

Each of the switching units 26 and 30 includes circuits, to be subsequently discussed, for coupling the time division lines to any of the locations of storage 28. The particular coupling relationships usually differ in each time slot of a frame, but the same coupling between line and storage is employed repeatedly in successive frames for any particular message. A necessary sequence of connections for a line is stored in a control memory, to be discussed, for such line. Connection information stored is advantageously a location name in storage 28, and the name is decoded when read out to provide a control signal on an appropriate circuit for controlling the connection and for advising pathfinding logic 32 of the action.

Operation of pathfinding logic 32 is initiated by a clear and start signal on a circuit 37 from the input switching unit 26. Thereafter operation is continued in response to input control signals $I_i$ supplied on a cable 38 from the unit 26 and output control signals $O_i$ supplied on a cable 39 from the output switching unit 30. Clock signals of different types are also received from central control 20 on a circuit 40. Control memory outputs from the memories directly or from their decoder circuits are provided by way of circuits 41 and 44 from the switching units to the logic 32. Upon completion of a pathfinding operation, the logic 32 supplies appropriate time slot and storage location information to switching units 26 and 30 by way of circuits 42 and 43, respectively. However, if a blocking condition is found which indicates insufficient delay storage equipment availability at appropriate times, a blocking signal is supplied on a circuit 46 to the central control 20 for initiating appropriate supervisory signalling action with respect to the calling party. In a similar manner, signals on a circuit 45 inform central control of the completion of different pathfinding steps, e.g., output line time slot blockage, so further action can be initiated.

Figure 2:
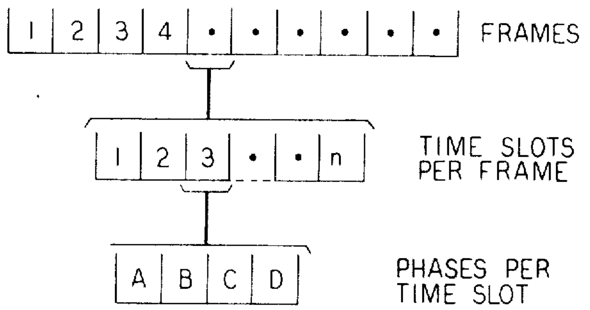
FIG. 2 is a diagram indicating time relationships in the system of FIG. 1.

FIG. 2 depicts briefly several time relationships which are understood in the art for time division multiplex systems. Thus, at the top of the figure are represented plural frames of message signal transmission, and in any given system a predetermined number of frames per second are transmitted on each time division line. Each frame is subdivided into $n$ time slots during which a time slot unit of message signal from a line is transmitted. A time slot pulse or a time slot clock word persists for substantially a full time slot. Each time slot is further subdivided into a plurality of phases during which different control operations take place in the office 13. In FIG. 2 a time slot such as the time slot 3 is shown as being subdivided into four phases A through D, respectively, which are the phases utilized in a reentrant shift register embodiment of the invention which will be described. The same sequence of phases recurs during each time slot just as the same sequence of $n$ time slots recurs during each frame.

When it is determined that a subscriber is seeking to establish a new connection, the office 13 performs the necessary connect search operation separately but simultaneously with the time slot interchanging functions for previously established connections during the successive time slots and frames of signal transmission. However, only one connect search operation or one disconnect search operation is carried out at any given time. Accordingly, once a time slot or a hardware unit is identified for use in setting up a particular call, its availability status is retained for that particular search operation until a complete path through the office 13 is determined. Upon the completion of such a determination appropriate entries are made in the control memories of the switching units 26 and 30 to establish the time division multiplex connection through the office 13. This control write operation is carried out without interrupting normal time slot interchange operations by writing into control memories during time slot phases when such memories are not otherwise being read out or written.

Figure 3:
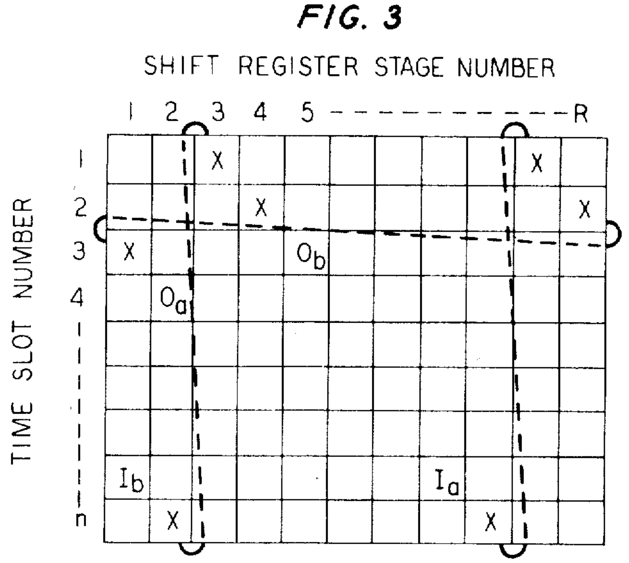
FIG. 3 is a time-storage domain diagram illustrating the operation of the invention.

Before proceeding to a discussion of details of particular portions of the system of FIG. 1 which are different from what one finds in the prior art, it is convenient to consider in connection with FIG. 3 a simplified representation of the time-storage domain which has been heretofore mentioned. The representation of FIG. 3 is applicable to a shift register embodiment, which will be hereinafter described, and includes rows and columns of blocks which are identified by different register stage numbers along a particular row and different time slot numbers along a particular column. Thus by scanning down a column of the diagram in FIG. 3 it can be seen immediately in which of $n$ time slots during a frame the register stage corresponding to that column is in use. Similarly it can be seen by scanning along a row which of R stages of the register are in use during a particular time slot.

In FIG. 3 time slot delays for two particular calls are indicated in the diagram. An "I" indicates the input point to the time-location sequence employed for the call and an "O" indicates the output terminal point of the sequence. Intervening points are indicated by X's in the appropriate blocks of the diagram. For example, one sequence $I_a$–$O_a$ begins in stage R–3 at time slot $n$–1. In the last time slot $n$ of one frame, the message information bit resides in stage R–2; and in the first time slot of the succeeding frame the bit is found in stage R–1. In time slot 2 of the latter frame, the bit resides in stage R of the register; and for time slot 3 the bit is recirculated to the first stage of the register. This same sequence ends with the bit resting in stage 2 of the register during time slot 4. A second sequence $I_b$–$O_b$ is also shown in the diagram and begins in stage 1 during one frame and terminates in stage 5 during time slot 3 of the next succeeding frame.

All of the blocks in FIG. 3 which include no characters indicating a time slot delay sequence are available for use in additional sequences. A plurality of such sequences can be independently carried out during any one frame and even during any one time slot, since the availability of delay storage locations is not restricted to a common input connection or a common output connection. For example, it can be seen in FIG. 3 that both of the illustrative sequences just described start in different stages of the shift register during the same time slot $n$-1. These sequences continue independently of one another, but simultaneously, in different regions of the register. The two sequences overlap in the first and second stages of the register but during different pairs of time slots so there is no overwriting or other interference with message signal information being delayed during the two sequences.

The aforementioned pathfinding logic 32 makes it possible to find an appropriate available sequence in the delay storage 28 once any particular pair of calling and called time slots have been identified. When such a sequence has been determined, it is used for time slot delay storage with complete assurance that there will be no danger of new information overwriting old information to the detriment of either set of message information. Likewise much less delay storage hardware is required to stand idle in anticipation of a possibility of the occurrence of a need for a long time slot delay on some time division line. The arrangement of the invention is made possible by the fact which is known in the time division multiplex switching art that for typical traffic loading the time slot delay required for the average call is comparatively short in relation to the total number of time slots in a frame. In FIG. 3 the two examples shown required time slot delays of six and five time slots, respectively, in a system using a minimum delay strategy, to be discussed, and with an offered traffic level of about 0.5 erlang per time slot on a time division line. Such delays are longer than is usually required on the average in such a system.

In one example of a time division system of the type illustrated in FIG. 1, the design included M input lines and M output lines where M was equal to 4. The reentrant shift register utilized for the delay storage 28 included R stages wherein R was equal to 2M, i.e., 8. This arrangement provided a blocking probability of about 5 percent with an offered traffic loading of about 0.5 erlang per time slot on a line. That blocking probability and loading are approximately the maximum generally employed in the art for telephone and data transmission systems. A lower blocking probability can be realized by extending the size of the shift register to 3M stages to make a total of twelve, which is less than the number of time slots per frame utilized by most designers skilled in the art for time division multiplex systems. However, the most advantageous number of stages, i.e., storage locations for delay storage 28 using a minimum delay strategy, to be described, for pathfinding is experimentally determined in terms of the number of lines, and to some extent the number of time slots, as well as the desired blocking probability and traffic loading per channel for a particular application. For some pathfinding strategies, not considered in detail here, the number of time slots must be considered to a greater extent.

Figure 4:
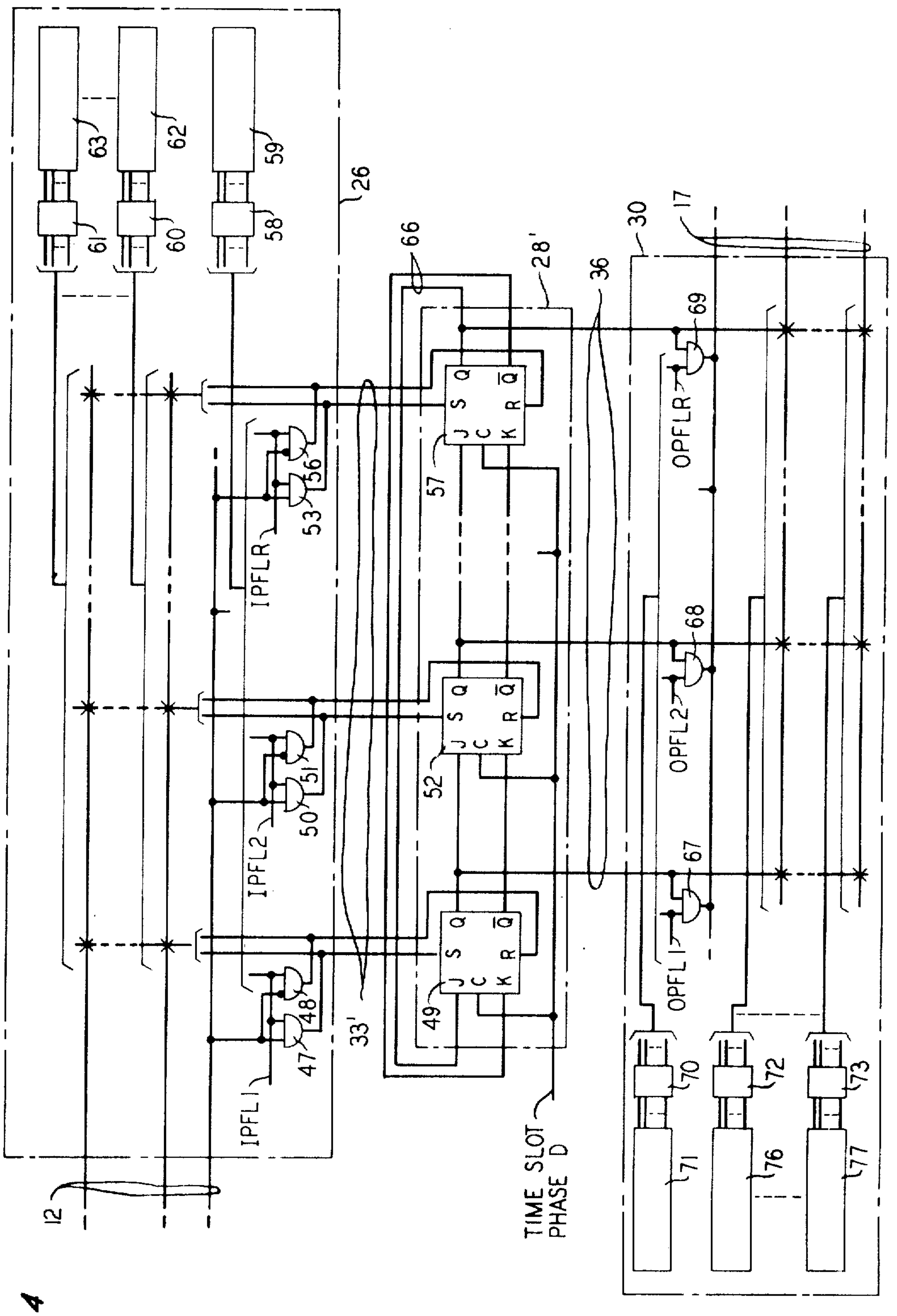
FIG. 4 is a schematic diagram of switching units and time slot delay storage in one embodiment of the system in FIG. 1.

FIG. 4 illustrates additional detail of the switching units 26 and 30 and the delay storage 28 for an embodiment of the invention wherein a reentrant shift register 28' is utilized for such delay storage. The switching unit 26 includes a space division switching matrix wherein the row circuits are the input time division lines 12 and the column circuits are the coupling circuits 33, in double-rail form, which are utilized to control the states of individual bistable circuit stages of shift register 28'.

Each matrix cross-point in unit 26 includes a pair of coincidence gates as indicated for the bottom row of the matrix in FIG. 4. Thus, a pair of gates 47 and 48 are utilized to convert single-rail time division signals appearing on the bottom rail of the matrix into double-rail signals for application to a bistable circuit 49, which is the first, or lowest order, stage of register 28'. For this purpose the gate 47 receives at one input the true form of signals on that rail circuit while the gate 48 receives in complement form at one of its input connections the same signals. Coincidence gates and complement, or inhibit, input connections of the type indicated are well known in a variety of suitable forms to those skilled in the art. A similar pair of gates 50 and 51 couple the same rail signals to a bistable circuit 52 in the second stage of shift register 28', and gates 53 and 56 couple those signals to inputs of a bistable circuit 57 which is in the Rth, or highest order, stage of register 28'. Each of the aforementioned pairs of cross-point gates is individually addressable for the application of enabling signals by a 1-out-of-R type of output signal from a decoder 58 which converts to that form the binary coded register stage name output information received from a control memory 59. Various forms of memory and decoder suitable to this purpose are known in the art and details thereof are not here presented. However, associated logic circuits for interfacing the decoder and memory with the rest of the system will be considered in connection with FIG. 5. Crosspoint gates and controls therefor for other crosspoints of the switching matrix in switching unit 26 are of the same type as those already described and are thus indicated schematically by an X at each crosspoint in the remainder of the matrix illustrated. Crosspoints for the two remaining matrix rails that are indicated are controlled respectively by decoders 60 and 61 associated with control memories 62 and 63.

The bistable circuits in the various stages of shift register 28' are advantageously of the type sometimes designated J-K flip-flops. Signals applied at the J and K inputs of the flip-flop circuit control the state of that circuit if that state should be different at the time of application at the C input of a clock signal, in this case the time slot phase D signal which is applied in multiple to all stages of the shift register. However, additional set and reset input connections are provided to each flip-flop circuit from the previously described space division switching matrix and are able to force the flip-flop circuit to the bistable condition indicated by time division message signals from the matrix without the occurrence of the clock control signal input to the flip-flop circuit. Each stage of the register 28 has its Q, or binary ONE, output connected to the J input of the succeeding stage and its $\overline{Q}$, or binary ZERO, output connected to the K input of the succeeding stage. Output connections of the Rth stage 57 are looped around by connections 66 for similar control of the input stage 49 to form a reentrant shift register.

Q output connections of the respective stages of shift register 28' are applied by the coupling circuits 36 to the respective column rails of another space division switching matrix in output switching unit 30. The row rails of this latter matrix are the output time division multiplex lines 17, and a single coincidence gate is provided at each matrix crosspoint. Illustrative gates 67, 68, and 69 are shown for the cross-points connected to the uppermost rail of the matrix in FIG. 4. Each of these gates has one input connection from a corresponding associated column rail of the matrix, and they all have their single output connections to the upper row rail of the matrix. The gates are individually enabled for operation by control signals supplied from a decoder 70 which is operated by an output control memory 71. As in the case of the input switching unit 26, additional matrix crosspoints are indicated by X's in the output switching unit 30 and the two additional rows of such crosspoints are controlled respectively by decoders 72 and 73 and control memories 76 and 77. When one of the crosspoint gates is enabled it couples a time division multiplex time slot unit message signal from its associated matrix column circuit to the time division output line 17 which is connected to such gate. In the embodiment of FIG. 4 the input and output control memories include word storage locations corresponding to each time slot of a time division multiplex frame. Stored in those word locations for control memories of input and output lines are binary coded names of appropriate stages, for time slot interchange coupling, of the register 28' corresponding to column rails of the input and output space division switching matrices. Time base signals from central control 20 simultaneously scan the control memories at the time slot rate. Consequently, the readout of a particular word location in a corresponding time slot is converted to a 1-out-of-R format by the associated control memory decoder and applied to the indicated matrix crosspoint gate. Thus, each input line 12 has access in every time slot to every stage of the register 28', and the particular stage used at any time slot is governed by the corresponding control memory word. However, multiple simultaneous access to any single stage is prevented by the storage of appropriate stage names in the control memories under the influence of the pathfinding logic 32 as will be further described in greater detail.

It will also be seen in FIG. 4 that branching connections are provided at the crosspoint gate enabling input leads which are controlled by control memory decoder outputs. These branching connections are designated IPFL_ in the input switching unit 26 and extend to the pathfinding logic 32 for a purpose which will subsequently be described. The blank in the lead reference character will contain the numerical designation of the corresponding stage of the register 28'. Thus, the IPFL2 lead extends the crosspoint gate control signal from the gates 50 and 51 of the second stage to the pathfinding logic 32. Similar control circuit extensions are provided from the inputs to all of the crosspoint gates in the input space division switching matrix. In like manner control circuit extensions are also provided in the matrix of the output switching unit 30 and are similarly designated OPFL_.

Figure 5:
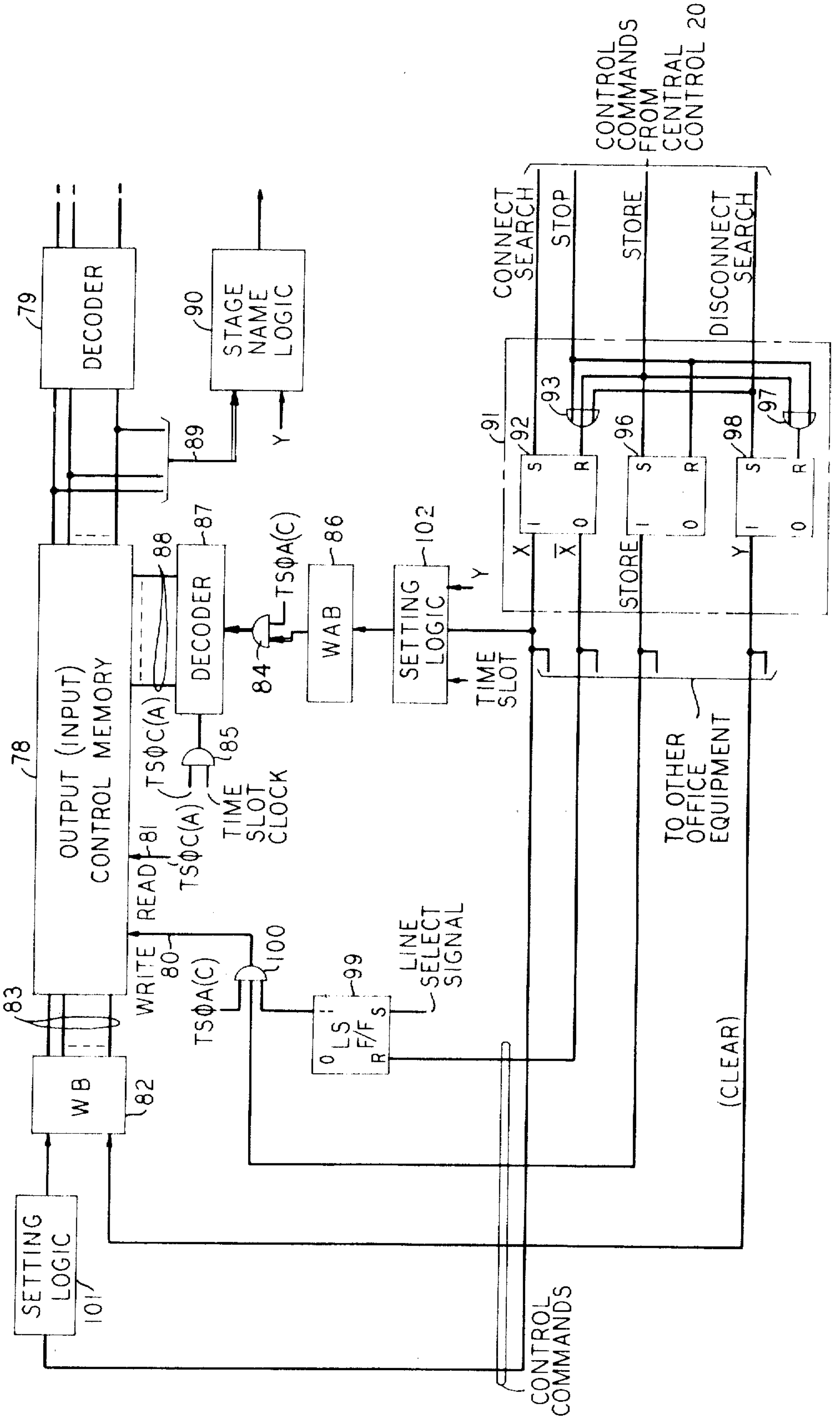
FIG. 5 is a simplified circuit diagram of a control memory in the switching units of FIG. 4; 10th

In FIG. 5 are circuits associated with a control memory 78 corresponding to any of the input or output control memories in FIG. 4, but for purposes of illustration time slot phase signals are shown for an output control memory with signals for an input control memory indicated in parentheses. Thus, TSφA(C) indicates time slot phase signal A for an output memory and C for an input memory. The difference between phases for input and output is necessary to allow message signals to be moved through delay storage 28 in the same time slot if no time slot interchange is needed.

Most of the associated circuits in FIG. 5 were considered to be included within the schematic representation of a memory in FIG. 4. As was previously noted, the control memory 78 per se and its decoder 79 are of any of the suitable types which are known in the art for performing the previously described functions. In other words, the memory 78 stores a delay storage location name to be normally read out in a sequence of time slots for controlling connection of the input time division lines 12 to appropriate storage location input connections during each time slot and, similarly, controlling connection of outputs of those locations to output time division lines 17 during each time slot. The method for performing these functions includes actuation of write enable gates and read enable gates not specifically shown in FIG. 5 but actuated by signals on circuits 80 and 81, respectively, for coupling signals from memory buffers to the memory drive circuits for actuating individual memory storage locations.

In the digit direction, a write buffer 82, otherwise designated WB, temporarily stores the name of a delay storage location such as the stage number of a stage in shift register 28' of FIG. 4. This information is coupled at appropriate times indicated by control signals by way of memory digit circuits 83 to determine the state of particular memory locations. In the word direction, memory word address information in the form of the name of a time slot in a frame is temporarily stored in a word address buffer 86, otherwise designated WAB. The time slot name is coupled at appropriate times, i.e., time slot phase A for an output memory and phase C for an input memory, through a gate 84 to a decoder 87 wherein the binary coded time slot representation is converted into a 1-out-of-$n$ representation for application to one of the $n$ word drive leads 88. Those leads couple the decoder output through the mentioned read enable gates and write enable gates to the word locations of memory 78.

During normal message transmission the word locations of each memory are scanned by the application of time slot names through a gate 85 and the decoder 87, in time slot phase C for an output control memory in the recurring sequence of time slots. Time base pulses in time slot phase C, for an output control memory, are applied on lead 81 for coupling those word address signals to the memory locations for reading out such locations in sequence to the decoder 79. Such readout is in the form of the binary coded shift register stage names and decoder 79 converts the binary coding to 1-out-of-R coding for application to appropriate matrix crosspoint gates in the appropriate switching units 26 or 30. The binary code format of readout from memory 78 is also applied through circuits 89 to certain parts of the path finding logic which will be described but which are, in FIG. 5, simply schematically indicated as stage name logic 90.

The operation of a control memory is heavily dependent upon control commands received from central control 20. Accordingly, there is also shown in FIG. 5 control command translating logic 91 which translates those commands into appropriate control signals that are utilized by the control memories and by other circuitry, found primarily in the pathfinding logic 32. One of the control commands is a CONNECT SEARCH command. The purpose of this command is to enable memory and logic circuits for determining a suitable time-location sequence in the delay storage 28 for a particular call which is to be connected. For this purpose the CONNECT SEARCH command sets a bistable circuit 92 to produce at the binary ONE output an X control signal. Similarly, a STOP command is applied through an OR logic gate 93 for resetting the bistable circuit 92 to terminate the X control signal and produce an $\bar{X}$ control signal. When an appropriate path has been determined, central control 20 provides a STORE command to set a further bistable circuit 96 for generating a store control signal, and the STORE command is also applied through the gate 93 to reset bistable circuit 92 and through another OR-gate 97 to reset a further bistable circuit 98. The store control signal is utilized to transfer the store-location path-defining information to appropriate control memory locations. Bistable circuit 98, just mentioned, is set by a DISCONNECT SEARCH control command for producing at the binary ONE output of bistable circuit 98 a Y command signal which is utilized to enable memory and logic circuits for locating and clearing information defining a call connection for thereby taking down such connection. The DISCONNECT SEARCH command is also applied through the OR-gate 93 for resetting the bistable circuit 92.

When a calling subscriber initiates a call, central control 20 identifies the incoming one of the time division lines 12 being used by that subscriber and identifies the time slot assigned to the subscriber in a concentrator, e.g., line concentrator 11. Those two pieces of information are retained in memory in central control 20 for future use during the establishment of a call connection, the maintenance of that connection, and the ultimate operation of taking down the connection. When the call is initiated by the subscriber as just outlined, central control generates both the CONNECT SEARCH control command and a line select signal which is unique to the incoming time division line being used. The line select signal sets a line select flip-flop circuit 99 to provide one enabling signal to a coincidence gate 100 for subsequently generating the write enable signal on lead 80. The X control signal from bistable circuit 92 is applied to setting logic circuits 101 and 102 which schematically represent in FIG. 5 further circuits of pathfinding logic 32 which will be used to develop stage name and time slot name information for storage in the memory 78. Such information is ultimately transferred to write buffer 82 and write address buffer 86 for driving the memory 78 at the appropriate time.

Ultimately pathfinding logic 32 in FIG. 1 notifies central control 20 that a time-location path has been determined and central control initiates the STORE command which generates the store control signal and resets bistable circuit 92. The store control signal provides a further enabling signal to the gate 100 so that such gate may, during time slot phase A produce the write enable signal 80 to allow the memory to store in the proper time slot word location the stage name information previously applied to its buffer registers. This operation of the gate 100 in response to the store signal and time slot phase A is completed before the $\bar{X}$ output signal of bistable circuit 92 is able to complete the resetting of line select flip-flop 99. At a fixed predetermined time after the initiation of the STORE command, central control 20 produces the STOP command which resets bistable circuit 96.

Subsequently, the parties engaged in a call terminate the call, and when the calling party goes on-hook central control 20 generates the DISCONNECT SEARCH command and the line select signal for the calling party's line. The latter signal sets line select flip-flop 99 for the calling line control memory, and the Y control signal from bistable circuit 98 clears the write buffer 82. When the pathfinding logic 32 of FIG. 1 has identified the called party's line, that information is utilized to clear the write buffer of the output line control memory. When the necessary line and time slot identification information has been determined for calling and called lines, e.g., two frames after initiation of the disconnect search operation, central control produces a STORE signal to reset bistable circuit 98 and set bistable circuit 96. The all-ZERO information then in the write buffers of the selected lines is stored in the appropriate memory locations, thereby taking down the call connection.

Each control memory has its own decoders 87 and 79, flip-flop 99, and gate 100. A separate set of write and write address buffers is provided for the input control memories and another set for the output control memories. These buffers can be shared by a set of control memories because a single connect search function or a single disconnect search function is carried on at one time. A single command decoder 91 is provided and shared by the buffer register sets because connect and disconnect operations cannot be carried on simultaneously.

Throughout the time intervals when the setting up and taking down of call connections are taking place as just outlined, the input and output control memories operate routinely for controlling the necessary time slot interchange operations for calls already in progress. No interruption in that routine is required since control memory readout for normal time slot interchange operation takes place during time slot phase C for output memories (A for input memories), whereas the memory writing operations just described for the connect search and disconnect search operations take place during time slot phase A for output memories (C for input memories).

Figure 6:
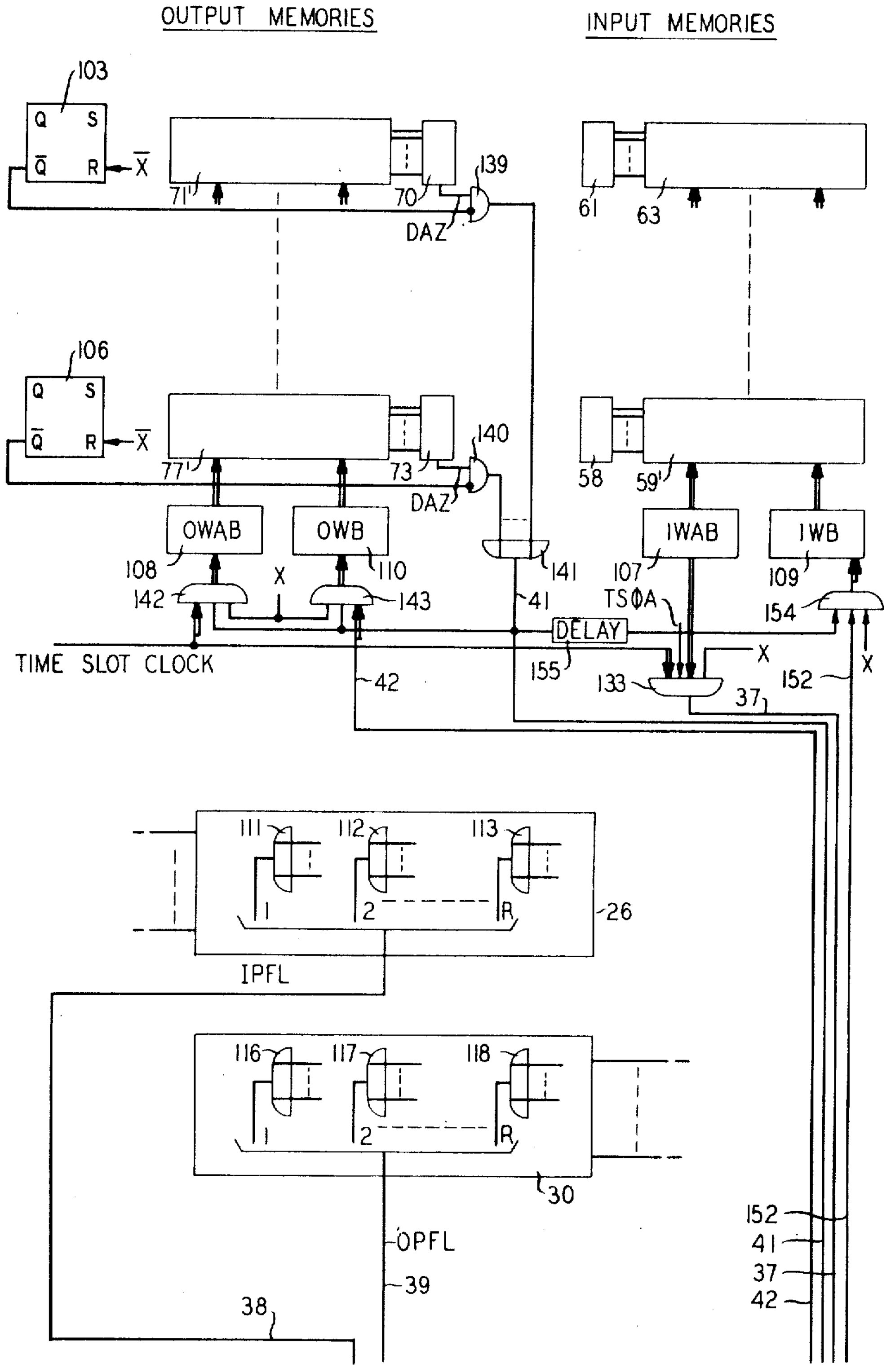
FIG. 6, 7, and 8 are diagrams illustrating application of one form of pathfinding logic to the system of FIG. 1.
Figure 7:
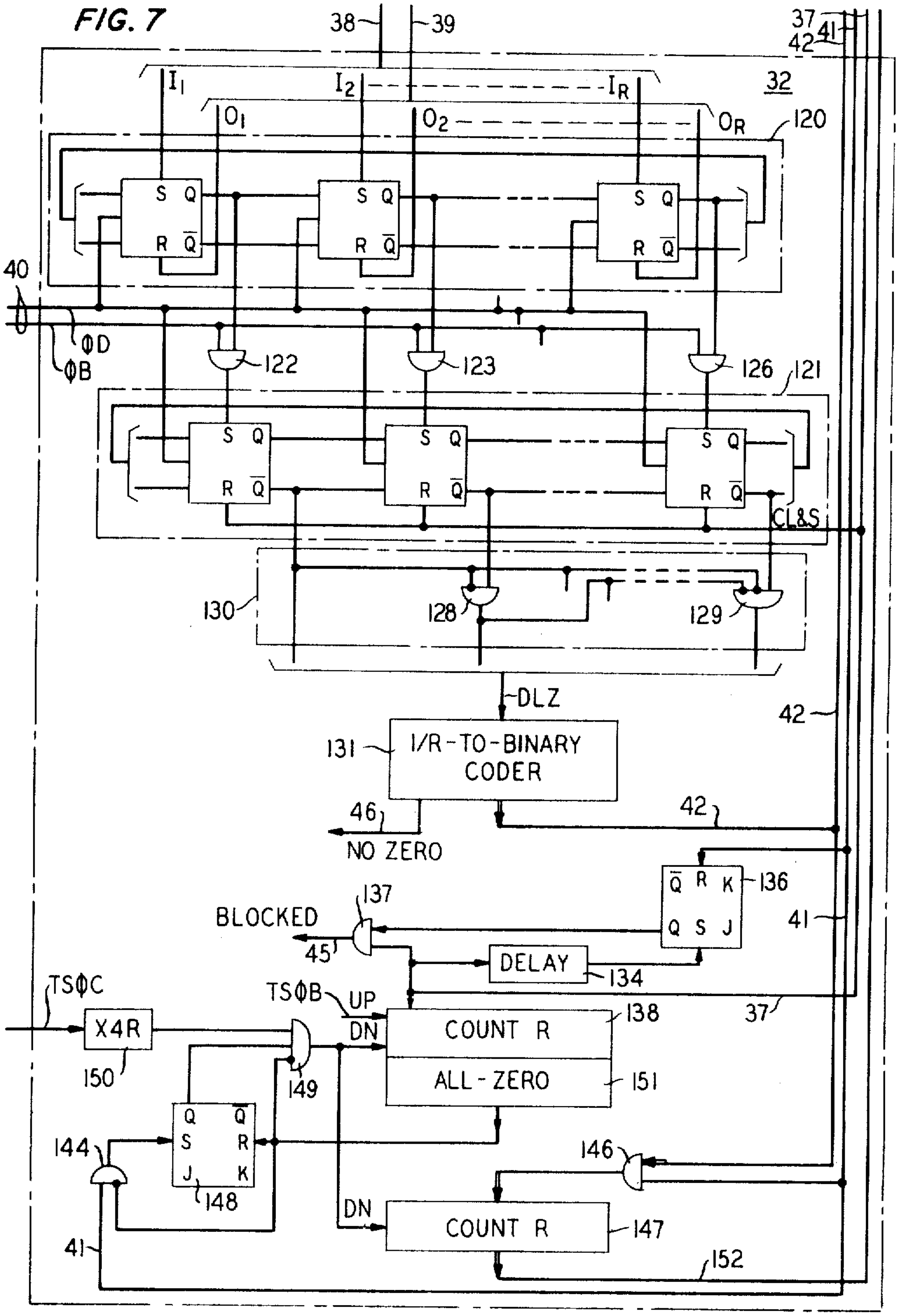
Figure 8:
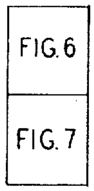

FIGS. 6 and 7 when combined as illustrated in FIG. 8 comprise a simplified diagram of the time division switching office 13 in conjunction with circuit detail of one embodiment of pathfinding logic 32. In FIG. 6 the input and output control memories and associated decoders are illustrated in somewhat the same relationship as they had been previously shown in FIG. 4 with input memories on the right and output memories on the left. In FIG. 6 the control memory schematic representation is modified somewhat in that the output line select flip-flop circuits, such as circuits 103 and 106, are shown separately from the associated output control memories 71' and 77' rather than being included within the schematic representation as in FIG. 4. Input and output write address buffers 107 and 108 serve input and output control memories, respectively, but full connections are indicated for buffer outputs to only the control memories 59' and 77', respectively. In like manner input and output write buffers 109 and 110 for input and output control memories have fully shown their connections to only control memories 59' and 77'.

In the systems described in the present application some operations are carried out in bit parallel fashion, and if all of the circuits and gates for those operations were shown the drawing would become tedious and complicated. Accordingly, a further schematic notation is employed wherein some circuits used for bit parallel operations are distinguished from those used in bit series operations by indicating the former by a double-shaft arrow included in series in the circuit path. Thus for example in FIG. 6, the output write address buffer 108 and the output write buffer 110 are coupled by bit parallel circuits so represented to their associated control memory 77'. This type of notation is employed throughout the drawing where it is useful to distinguish between bit series and bit parallel operations. Not all bit parallel operations are so indicated when it is obvious from the description that such an operation is involved.

It was previously shown that the switching units 26 and 30 of FIG. 1 produce input pathfinding logic signals IPFL_ and output pathfinding logic signals OPFL_ as shown in FIG. 4 to indicate control signal states in the switching units, respectively. Thus, in FIG. 6 OR-gates 111, 112, and 113 collect all of the IPFL_ control signals for the crosspoint gates of the respective R columns of the input switching unit crosspoint matrix. Outputs from these OR gates are separately applied by an IPFL cable 38 to the pathfinding logic 32 in FIG. 7. In similar fashion OR-gates 116, 117, and 118 collect crosspoint gate control signals for crosspoints in the respective R columns of output switching unit 30 crosspoint matrix. Outputs of OR-gates 116 through 118 are separately applied by an OPFL cable 39 to the pathfinding logic 32. Circuits in cables 38 and 39 are separately represented in FIG. 7 as I1, I2...IR and 01, 02...OR and are utilized for controlling the states of respective stages of a reentrant shift register 120 which is the same type and size as the register 28' in FIG. 4. Information contained in shift register 120 is shifted at the time slot rate during time slot phase D by signals applied to logic circuits 32 by way of a lead in the circuit 40. A further reentrant shift register 121 is provided for a purpose to be described and is also of the same type and size as register 28' and is stepped during phase D.

It will be seen, therefore, that shift register 120 receives through cables 38 and 39 signals which indicate when corresponding stages of shift register 28' are opened to receive time division message signals and when such message signals are read out of any stage of shift register 28'. This control signal status information is applied whenever new information is loaded into register 28' during time slot phase A and whenever information is unloaded from that register during time slot phase C, as discussed in connection with FIG. 5. After a pair of loading and unloading operations, the shift register 120 is stepped during phase D. Consequently, the state of any stage of register 120 may be changed in either of two ways, i.e., in accordance with normal J-K flip-flop circuit operation in the shift register sequence or during either of the mentioned loading or unloading operations. Since register 120 contains control signal status information, it is convenient to call it the status register. If a particular stage of the status register 120 is set during the loading operation that set state is then shifted along register 120 during each time slot phase D until in another stage of register 28' it is read out to cause the latter stage of status register 120 to be reset. These setting and resetting operations in register 120 correspond to the loading and unloading operations in register 28' for a bit of information during a particular call. The state of any stage in register 120 thus indicates the status of a call and is independent of the binary ONE or ZERO nature of the particular time division message information bit which is being delayed in register 28' during that call.

For purposes of the pathfinding logic 32 in FIG. 7, the additional shift register 121 is designated the compare register. The latter register is initially cleared by the clear and start signal on circuit 37 from input switching unit 26 at the beginning of a connect search operation. During time slot phase B, i.e., subsequent to a phase A loading operation but prior to a phase C unloading operation, a group of coincidence gates, such as gates 122, 123, and 126, is enabled by the time slot phase B signal to couple the Q, i.e., binary ONE, outputs of respective stages of status register 120 for setting corresponding stages of compare register 121. There is no coupling from the $\overline{Q}$ outputs of status register 120 to compare register 121, and as a result the latter register is unaffected by the readout of time division message signals from the delay shift register 28' in FIG. 4. Thus, once compare register 121 has been cleared for a particular connect search operation, any stage of the register can be set during any time slot when a corresponding stage of status register 120 is set; and this information is then shifted through the compare register 121 in succeeding time slots with no opportunity to be overwritten. Consequently, at any given time, the signal state of the $\overline{Q}$, or binary ZERO, output leads of stages of compare register 121 indicate which stages of delay register 28' in FIG. 4 are then available to receive new time division message signals and also have not theretofore received any such signals through circuits 33 in FIGS. 1 and 4 since the last clear and start signal on circuit 27.

An additional set of coincidence gates, such as gates 128 and 129, comprises a detect-low-ZERO circuit 130 which provides a distinctive output signal for indicating which of the stages in status register 121 contains the leftmost binary ZERO output. The lowest order stage has a direct output connection with no gate. Each of the gates 128 and 129 has an enabling input connection from the $\overline{Q}$ output of a corresponding stage of register 121. The first stage $\overline{Q}$ output, and the output of each gate, is further connected to an inhibiting input connection of each gate associated with a register stage of higher order. There is no end-around looping connection as there was for the shift register. No gate produces an output signal unless its associated shift register stage is in the reset state and all lower order stages are in the set state. Restated differently, any stage which is reset enables its own gate in the detect-low-ZERO circuit 130, and, if all lower order stages are in the set state, the enabled gate is actuated to produce an output signal which disables all higher order gates regardless of the state of their corresponding register stages. Thus, the detect-low-ZERO circuit 130 produces a distinctive output signal on only one of its R output circuits. All of those R output circuits are applied to a coder circuit 131 which translates the 1-out-of-R information into binary code format for application to a circuit 42. In the event that no stage of register 121 is in the reset state there is no output from the detect-low-ZERO circuits 130 and coder 131 produces the no-ZERO output on a circuit 46 which is applied to central control 20, as previously described in connection with FIG. 1, to indicate a blocked condition in the office 13. Such a blocked condition results in the production of a busy tone and a STOP command by central control 20.

Operation of pathfinding logic 32 begins when central control detects a subscriber request for call connection service. At that time central control gives the CONNECT SEARCH command and sets the line select flip-flop for the calling line. The input write address buffer, which is for this description assumed to be the buffer 107 in FIG. 6, is loaded from central control 20 with the calling time slot by circuits which are not specifically shown in FIG. 6 but which are schematically represented by the "time slot" input to the setting logic 102 in FIG. 5. Command logic 91 in FIG. 5 produces the X control signal which cooperates with a time slot phase A signal TS$\phi$A to enable a coincidence gate 133 in FIG. 6. This gate compares the binary coded form of the time slot stored in input write address buffer 107 and the binary coded form of current time slot names as provided from the time slot clock in central control 20. Upon the detection of a time slot match by the gate 133, a gate output signal is produced on circuit 37 and is the clear and start signal previously mentioned.

The clear and start signal clears the compare shift register 121 in FIG. 7 and, after a single time slot of delay in a delay circuit 134, sets a block detecting flip-flop 136. However, no blocking signal is immediately produced because the time delay required for sufficiently establishing the set condition of flip-flop circuit 136 to enable a coincidence gate 137 at the Q output of the flip-flop exceeds the time interval during which the current time slot phase A signals are present at the input to gate 133. Accordingly, gate 137 is not actuated at this time to produce a blocking output signal. However, if a full frame interval passes without flip-flop circuit 136 being reset, recurrence of the match condition in gate 133 will find the flip-flop circuit already set and will actuate the gate 137 to indicate to the central control that a blocked condition prevails.

Clear and start signals on circuit 37 are also utilized to initiate operations for computing the length of a time-location sequence from the starting time slot identified by actuation of gate 133 so that the free input stage in register 28' for that sequence can be determined. This is done by measuring the time which expires until an available time slot is identified on the time division output line which is utilized by the party being called by the calling party. Coupled with that measurement is a determination of a similar available stage sequence in delay shift register 28'. One form of circuitry for carrying out such a computation is that which is shown in FIG. 7 and the aforementioned clear and start signal on circuit 37 starts the computation by setting to the all-ONE state a modulo-R counter 138 which can be operated for counting in either direction.

Thereafter, counter 138 is operated to overflow from its set state in response to the next time slot phase B pulse provided from central control 20. An all-ZERO detector 151 is immediately actuated to reset a flip-flop 148 and to inhibit downcounting pulse supplies. While counter 138 is counting up in response to phase B pulses, the detect-low-ZERO circuit 130 is also in operation, and its associated coder 131 is providing output signals on circuit 42 identifying in binary coded form the lowest order stage of compare register 121 which includes a binary ZERO state indicating the end of a free time-location sequence in delay register 28'. While these operations are taking place, the control memories in switching units 26 and 30 are being continuously scanned and outputs of output control memories are being coupled to associated decoders such as the decoders 70 and 73 in FIG. 6. Each output memory decoder includes logic, not shown, for detecting the all-ZERO state and output from that logic is applied on a DAZ lead to an associated coincidence gate, such as one of the gates 139 and 140, for the corresponding memories. All of such gates, except the gate associated with the called line, are disabled because their respective line-select flip-flops are then in the reset state and apply $\overline{Q}$ outputs to inhibiting input connections of the decoder output all-ZERO gates. However, the line-select flip-flop for the line of the called party will have been set by output signals, on circuits not shown, from central control 20 upon identification of that line in response to called party identification supplied by the calling party.

Thus, on the selected output line the line-select flip-flop is in the set state and its $\overline{Q}$ output applied to the inhibiting input connection of the associated all-ZERO detecting gate has the effect of enabling that gate. As soon as the control memory of the selected line reads out an all-ZERO word indicating a free time slot, the memory decoder, e.g., decoder 73, actuates the associated gate 140 to produce a first-free-time-slot signal through an OR-gate 141 to the circuit 41. This signal on circuit 41 is applied to enable coincidence gates 142 and 143 at inputs to output write address buffer 108 and output write buffer 110. At this time the X control signal is also present, and the current time slot name is applied through gate 142 to output write address buffer 108 for actuating a corresponding word location in control memory 77'. Such memory is the only one that can respond to a writing operation since it is the only one with a line-select flip-flop in the set state for providing a write enable signal on the circuit 80 which is illustrated in FIG. 5. The coincidence of the X control signal and the first-free-time-slot signal on circuit 41 also actuates gate 143 to apply the output of coder 131 on circuit 42 to the output write buffer 110.

Output from coder 131 identifies the lowest order stage of delay register 28' which is, in that first-free-time-slot, available for readout to the time division output line 17 on which that time slot is free. Thus, output control memory 77' has available to it in its buffer registers 108 and 110 the time slot and stage name information needed to achieve a coupling to the called party's time division line 17.

Actually, any ZERO outputs of compare register 121 at the time of any free output time slot could be employed to establish a time slot interchange operation. However, the selection of the first free output time slot and the use of the lowest order ZERO stage information from compare register 121 assures operation with the least spread between input and output time slots and packs stage usage toward the low order end of register 28' so that the blocking probability, in the event that longer-than-average delay is needed, is kept as low as possible.

The first-free-time-slot signal on circuit 41 is also utilized to reset the flip-flop circuit 136 in FIG. 7 which is used for detecting a blocking condition. Thus, no blocking indicator can now be produced. That signal on circuit 41 is further employed for actuating a coincidence gate 146 to couple the same output information from coder 131 on circuit 42 into an additional modulo-R reversible counter 147. In addition, the first-free-time-slot signal on circuit 41 is applied through a coincidence gate 144 to set a flip-flop 148 if that gate is not then inhibited by output from all-ZERO detecting circuit 151. The Q, or binary ONE, output of the latter flip-flop enables a coincidence gate 149, if gate 149 is not inhibited by detector 151, to couple the output of a pulse rate multiplier 150 to the down counting input connections of counter 138. Multiplier 150 receives time slot phase C pulses from central control 20, increases their repetition rate by a factor 4R by known techniques, and drives counter 138 down at that rate. Counter 138 can in this way be counted down to its all-ZERO state within a single time slot phase because of the increased rate of counter operation. The time slot phase C pulse which initiated operation of the multiplier 150 thus causes a train of R down counting pulses to be produced before another time slot phase pulse occurs, and those R pulses are sufficient in number to clear completely the counter 138 regardless of its state.

All-ZERO detector 151 is coupled to counter 138, and when the count therein reaches ZERO the output of the all-ZERO detector 151 resets flip-flop circuit 148 and thereby stops the supply of fast pulses so the down counting is terminated. Counter 147 had been counting down simultaneously with counter 138 but from the binary code representation of the low order stage of delay register 28' which is available for readout to an output time division line. Consequently, when gate 149 is closed to terminate the flow of down counting pulses, the contents of counter 147 represent the name of the stage in register 28' of FIG. 4 into which a time division message signal bit must be placed in order to be read from that register in the stage indicated by coder 131 in the called time slot identified by the signal appearance on circuit 41. This information in counter 147 is coupled by way of circuit 152 and a coincidence gate 154 to the input write buffer 109 for storage in control memory 59', assuming that memory to be the one associated with the time division line of the calling party. To this end gate 154 is enabled by the X control signal and by the signal from circuit 41 after one time slot phase delay in a delay circuit 155. Thus, buffer 109 is loaded in phase D; and the information can be loaded in memory on the following STORE command.

The time division switching office 13 has now identified the calling and called lines and time slots as well as the names of the stages in delay register 28' where the bits of the corresponding call are to be stored and read out to comprise a time division connection with appropriate time slot interchange between the calling and called parties. The STORE command from central control 20 now produces the store control signal from the command logic 91 in FIG. 5, and that enables the coincidence gate 100 for each of the control memories 59' and 77' to be actuated for enabling the respective control memories to store the input stage name in memory 59' at the input time slot word location and store the output stage name in output control memory 77' at the output time slot word location. A subsequent STOP command resets the command logic 91 and the line-select flip-flops 99 for each of the control memories 59' and 77'. The newly connected call then proceeds in the usual manner with the appropriate time slot interchange until the calling party goes off-hook to initiate a disconnect search operation for taking down the necessary connections.

Figure 9:
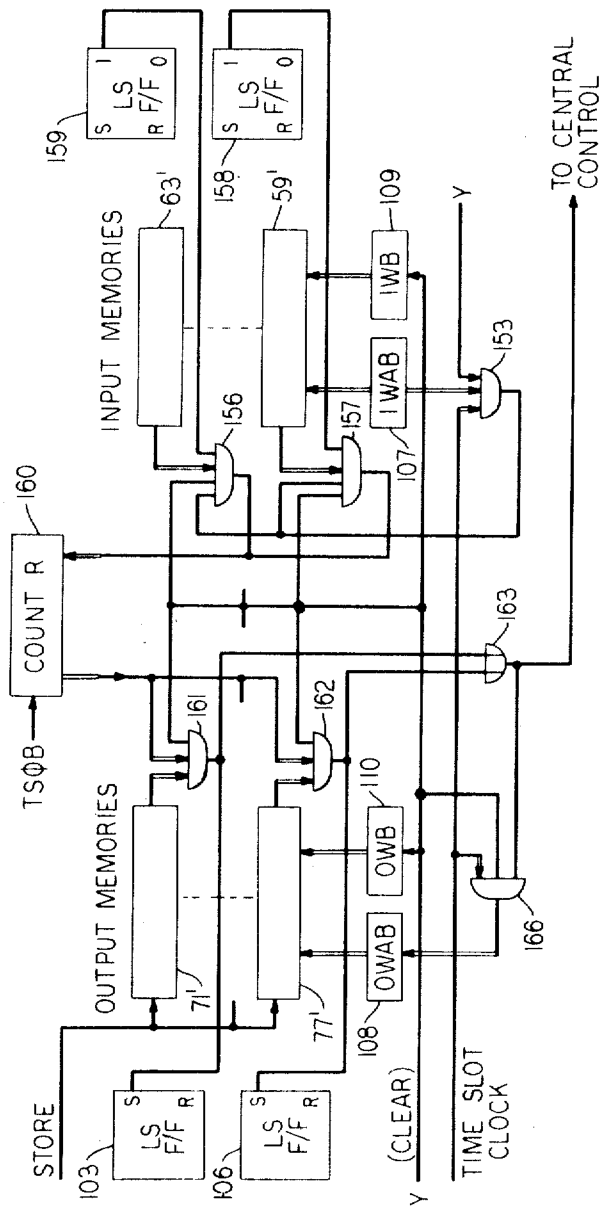
FIG. 9 is a circuit diagram illustrating disconnect search parts of the pathfinding logic applied to the system of FIG. 1.

FIG. 9 includes the disconnect search circuits which are included within the pathfinding logic 32 for supervising the operation of the input and output control memories. Once again the control memories are shown in this figure in approximately the same relationship in which they were shown in FIG. 4, and line-select flip-flop circuits for all of the illustrated memories are separately shown in association with their corresponding memories. The new on-hook condition for the calling party in the call to be disconnected is detected in the usual manner by central control 20 which then identifies the calling line and time slot in the usual manner. Central control initiates the DISCONNECT SEARCH command which produces the Y control signal for clearing memory write buffers as previously described. Central control also sets the line-select flip-flop, e.g., flip-flop 158, for the calling line control memory. The calling party's time slot is loaded into the input write address buffer 107 for the calling line, and in response to the Y control signal that time slot name is compared with time slot names from the time slot clock by a coincidence gate 153.

Upon the occurrence of a time slot match, the output signal from gate 153 enables additional gates, such as gates 156 and 157, which are connected to receive in binary coded form the digit readouts of the input control memories, such as the memories 59' and 63'. Gates 156 and 157 are also enabled by the Y control signal; and only one of them, e.g., gate 157, is further enabled by the binary ONE output of the line-select flip-flop 158 for the same input line. Line-select flip-flops for all other input control memories, e.g., flip-flop 159, are in the reset state. Thus, the output signal from gate 153 causes the stage name contained in control memory 59' for that same time slot to be coupled by the gate 157 into a modulo-R counter 160 which is driven by the time slot phase B signal to increment the binary coded representation of that stage name in a binary counting fashion at the time slot rate.

Outputs from counter 160 are continuously applied to a set of output control memory output gates, such as gates 161 and 162. These latter gates are also enabled by the Y control signal and receive further binary coded stage names from the output control memories as those memories are scanned in the course of usual time division message transmission. When one of the gates 161 or 162 detects a match between the stage names produced from counter 160 and a stage name produced from one of the output control memories, that gate, e.g., gate 162, is actuated. Output signal from gate 162 sets its line-select flip-flop circuit 106. The same output signal is coupled through an OR gate 163 to provide an enabling signal to a further coincidence gate 166. This signal actuates gate 166 to couple the binary coded name of the time slot which is then current to the input of output write address buffer 108. At the same time central control is informed that the output line and time slot have been identified so that a STORE command can be generated. This STORE command enables a writing operation in control memories 59' and 77' so that the all-ZERO contents of the previously cleared write buffers are transferred into the time slot word locations for the input and output time slots, respectively, as indicated by the input and output write address buffers 107 and 108. A subsequent STOP command from central control resets the command logic 91 and the connection for the terminated call is now completely disconnected.

Figure 10:
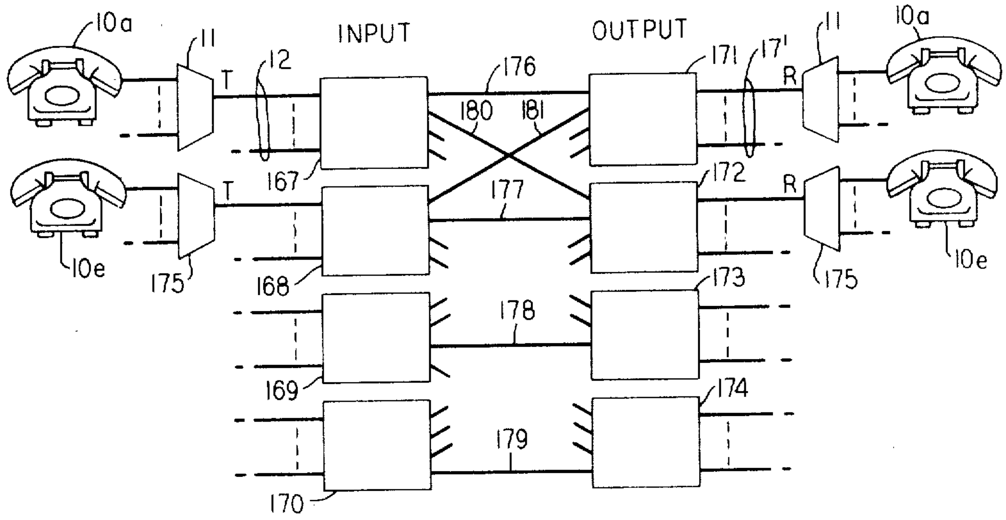
FIG. 10 is a simplified diagram of a system employing plural time slot interchange arrangements of the present invention.

The foregoing description has been limited for convenience of discussion to consideration of a small office including a single time slot interchanger for serving a multiplicity of time division lines. Obviously time slot interchangers do have capacity limitations; and, to meet expansion needs for an office, a plurality of time slot interchangers are advantageously interconnected as schematically represented in FIG. 10. Shown in that figure are four input time slot interchangers 167 through 170 and four output time slot interchangers 171 through 174. Each of these interchangers is schematically represented by a block which includes a pair of switching units interconnected by delay storage, such as shift register 28', in accordance with cooperation of pathfinding logic. For the purposes of this description, all such interchangers are assumed to be operated under the control of a common central control 20 as described in connection with FIG. 1.

It is assumed that the interchanger 167 serves the time division input lines 12 as shown in FIG. 1, and that the interchanger 171 serves the output time division lines 17' similar to output lines shown in that same figure. Thus, subscribers shown on the left and the right in FIG. 10 are the same. Each input interchanger 167 through 170 has four output time division links from the outputs of its respective output switching unit 30 and extending to input switching unit 26 of difference ones of the output interchangers 171 through 174, respectively.

Only six of the time slot interchanger coupling links are specifically shown in FIG. 10. These include the four direct coupling links 176 through 179, respectively, between pairs of interchangers serving the same set of line concentrators and two additional links 180 and 181 illustrating the further link connections between different pairs of concentrators.

Operation of the system in FIG. 10 for any call that extends in one direction through a pair of time slot interchangers is carried on by two successive operations of the type described in connection with the system of FIG. 1. However, for embodiments such as the one so far described that does not employ line buffers on input and output time division lines, there must be a common transfer phase. Such a phase is realized by having the input and output time slot phases of a driven interchanger shifted with respect to those of a driving interchanger.

To set up a connection between a calling subscriber served by the input interchanger 167 and a called subscriber served by the output interchanger 172, the pathfinding and connection setup takes place as already described but considering the link 180 to be the one on which an available called time slot must be determined for interchanger 167. Upon completion of the pathfinding operation for interchanger 167, central control assigns the output, or called, time slot determined in that operation as the input, or calling, time slot on the link 180 for interchanger 172. A similar pathfinding operation now takes place in the interchanger 172 to determine an available time slot on the output time division line for the called party 10e served by interchanger 172 and concentrator 175. Thereafter an available time-location sequence is determined in the delay storage 28 for the interchanger 172. The connection through and between interchangers 167 and 172 is then set up to establish one direction of communication between the calling and called parties, i.e., the talking path. Central control then proceeds to set up a second, or listening, path which extends from concentrator 175 through the input interchanger 168 serving the transmitting circuit of the called party 10e, the time division link 181, and the output interchanger 171 serving the receive circuit for the calling subscriber 10a. Such listening path advantageously has an independent pathfinding determination, and often time slots employed are different from those used in the talking path.

Figure 11A:
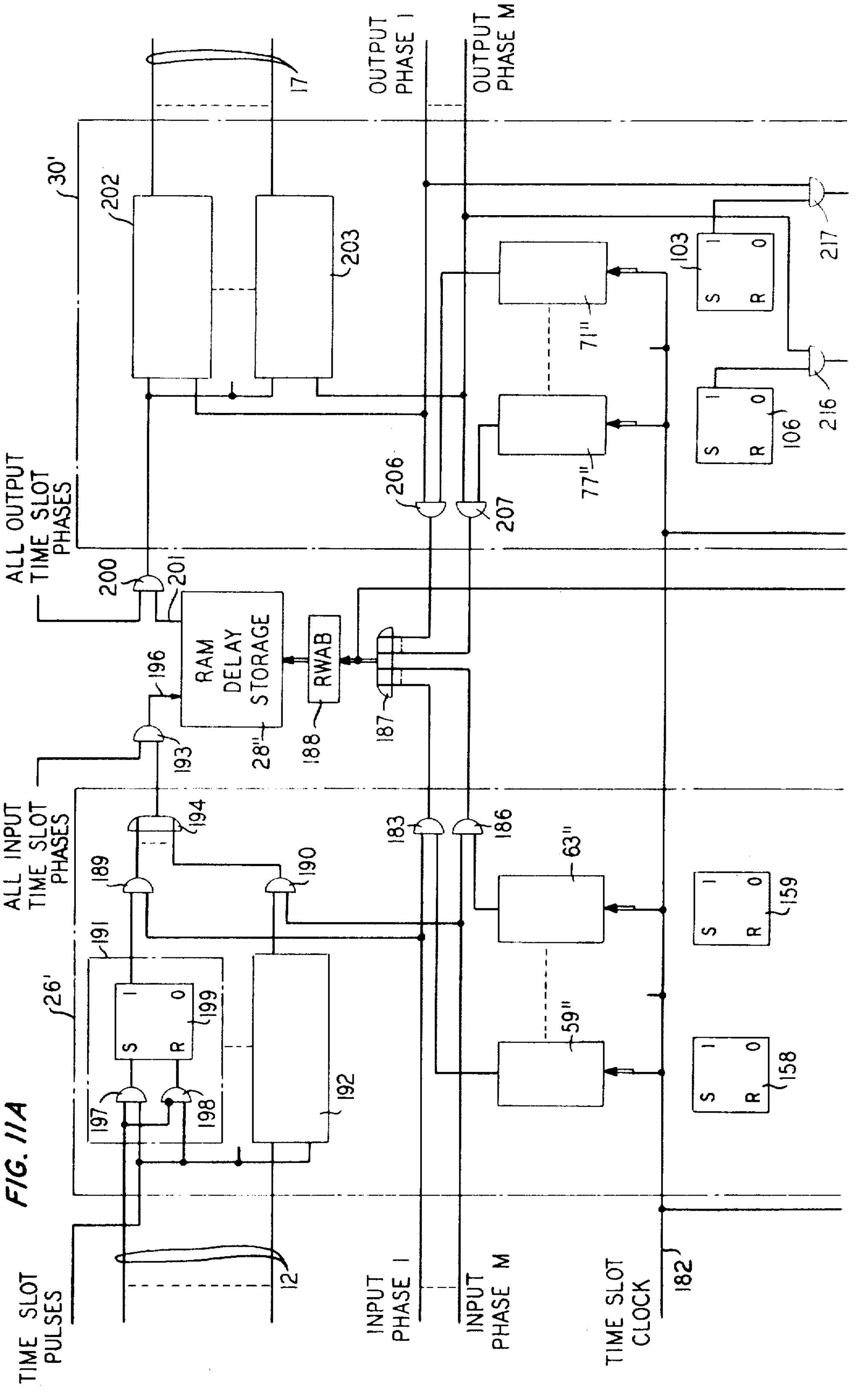

FIGS. 11A and B are together a partial simplified diagram of a time slot interchanging embodiment of the invention utilizing a random access memory 28'' for the time slot delay storage 28. This is a static form of delay storage which can be used in lieu of the dynamic form represented by the shift register 28' in FIG. 4. In this embodiment access to the delay storage is gained by scanning the control memories for the input and output time division lines 12 and 17, respectively, once during each time slot to determine which line shall have access to which location in the memory 28'' during each such time slot. Assuming once more for convenience a single bit time slot interchange operation, memory 28'' is advantageously comprised of an array of individual bistable elements such as the individual flip-flop elements of a semiconductor memory array. In other words, each storage location is a separate entity with no information interchange capability directly provided between the respective storage locations. One double-rail bit circuit provides input information coupling to all of the storage locations and selective access to individual locations is provided by enabling input circuits which may be either individual to the respective locations or which may be on a coincident current access basis. Either form of location enabling access is known in the art and for the purposes of the present description is is assumed that the respective locations are individually accessed by separate input connections, i.e., R enabling input connections for R storage locations.

In a system employing M input time division lines 12 and M output time division lines 17, each time slot is divided into 2M+1 phases rather than the four phases heretofore indicated in connection with FIG. 2. During the first M input phases of each time slot, the input time division lines and corresponding control memories at locations for that time slot are scanned. Corresponding location status information is also provided to pathfinding logic 32' as will be described. In the next time slot phase interval information about the available or free status of locations in memory 28'' is transferred in the pathfinding logic 32 between status and compare registers in an operation corresponding to that previously described in connection with the phase A loading operations in FIG. 7. Thereafter during the M final, or output, phases of the time slot, the output control memories are scanned in sequence and information units in the locations of memory 28' indicated by control memory readout are distributed among the output lines. Thus, during each time slot each input line 12 and each output line 17 can have access to any one of the storage locations in memory 28'', and it will be shown that pathfinding logic 32' functions, in a manner similar to that previously described, for determining an available sequence in the time-storage domain for memory 28''.

Switching units 26' and 30' are also provided in FIGS. 11A and B for implementing the scanning coupling mode used there rather than the simultaneous coupling mode employed in FIG. 4. The number of storage locations required in memory 28'' corresponds to the number provided in the shift register 28' in FIG. 4 for the same situation wherein a single delay storage array is serving multiple time division input lines and multiple time division output lines.

In FIG. 11A the control memories, such as memories 59'', 63'', 77'', and 71'', for the respective time division lines store in different word locations the names of locations in memory 28'' which are to be accessed in a time slot sequence. The writing of this information into those control memories and the reading out of that information is carried on in much the same fashion previously described in connection with FIG. 5 except that now the readout is utilized for a small fraction of each time slot, which fraction is unique for any one memory, instead of for a longer fraction of a full time slot, which latter fraction is common to a group of memories. Each of the control memories is advantageously a memory in which readout information is available for an interval of controlled duration. One such arrangement might be a magnetic core memory with a buffer readout register, and another, and presently preferred, arrangement is a semiconductor memory wherein the contents of an address location are continuously available for as long as the location output is enabled. For convenience of description the latter format is assumed, and time slot clock information is provided in circuits of a cable 182 from the time slot source in central control 20 already outlined in regard to FIG. 5. These time slot signals enable, during each respective time slot, a corresponding word location in each of the input and output control memories.

During M input phases of any given time slot, corresponding input time slot phase signals on individual circuits enable coincidence gates, such as gates 183 and 186, for sequentially coupling input control memory readout words through a common OR-gate 187 and a common read-write address buffer 188 to a common decoder, not separately shown, in memory 28''. That decoder translates the binary coded storage location names into a 1-out-of-R code, as previously described, for accessing the individual memory location which is addressed.

Each input time slot phase signal is also applied to enable a separate time division line coincidence gate, such as gates 189 and 190, for coupling the time division message signal on a respective input time division line 12 through a corresponding one of the line buffer registers, such as registers 191 and 192. Output from the line gates is combined in an OR-gate 194 for coupling through a clocking coincidence gate 193 which is enabled during each input time slot phase to apply the respective line message signals to an information input connection 196 for memory 28''.

Buffer registers for input and output time division lines are all of the same type, and a schematic diagram is shown in the block representing the input line buffer register 191. Thus, the input time division message signal from a line is converted from single-rail form by a pair of coincidence gates 197 and 198 for application to the set and reset inputs of a flip-flop circuit 199. The time division information signal is applied to a true input connection on gate 197 and a complement, or inhibit, input connection on gate 198. Both of those gates are further enabled at the time slot rate during each complete time slot by a time slot pulse train. Thus, the signal on each time division line is sampled at the time slot rate for the full time slot interval by its line buffer, and the contents of those buffers are respectively sampled in the sequence of input time slot phases for application to input circuit 196 of memory 28''.

If the message signal on circuit 196 during a particular time slot phase is to be stored in memory 28'', an appropriate storage location therein is addressed from the output of the control memory for the line corresponding to that phase. However, if that message signal is to be ignored, no location in memory 28'' will be enabled from the input control memory to receive message signal; and the contents of the memory are thus, during that phase, left totally undisturbed.

In order to extract information from memory 28'' all output time slot phases are applied in sequence to a memory output gate 200 for coupling any memory readout on a readout connection 201 of the memory digit circuit in common to the message input connections of all time division output line buffer registers, such as the registers 202 and 203 in FIG. 11A. These registers are of the same type previously noted in connection with the input switching unit 26' but in this case the clocking input connections of the respective registers are actuated in sequence by the M output time slot phase signals rather than being actuated simultaneously by the time slot pulses. The same M output time slot phase signals enable respective memory output coincidence gates, such as gates 206 and 207, for coupling outputs from respective output control memories through OR gate 187 and read-write address buffer 188 to memory 28''. If during a particular output time slot phase no location of memory 28'' is to be read out, then the word location of the output control memory which is sampled during that phase contains all-ZEROS, i.e., an invalid address, and no memory output signal is applied to output gate 200.

Figure 11B:
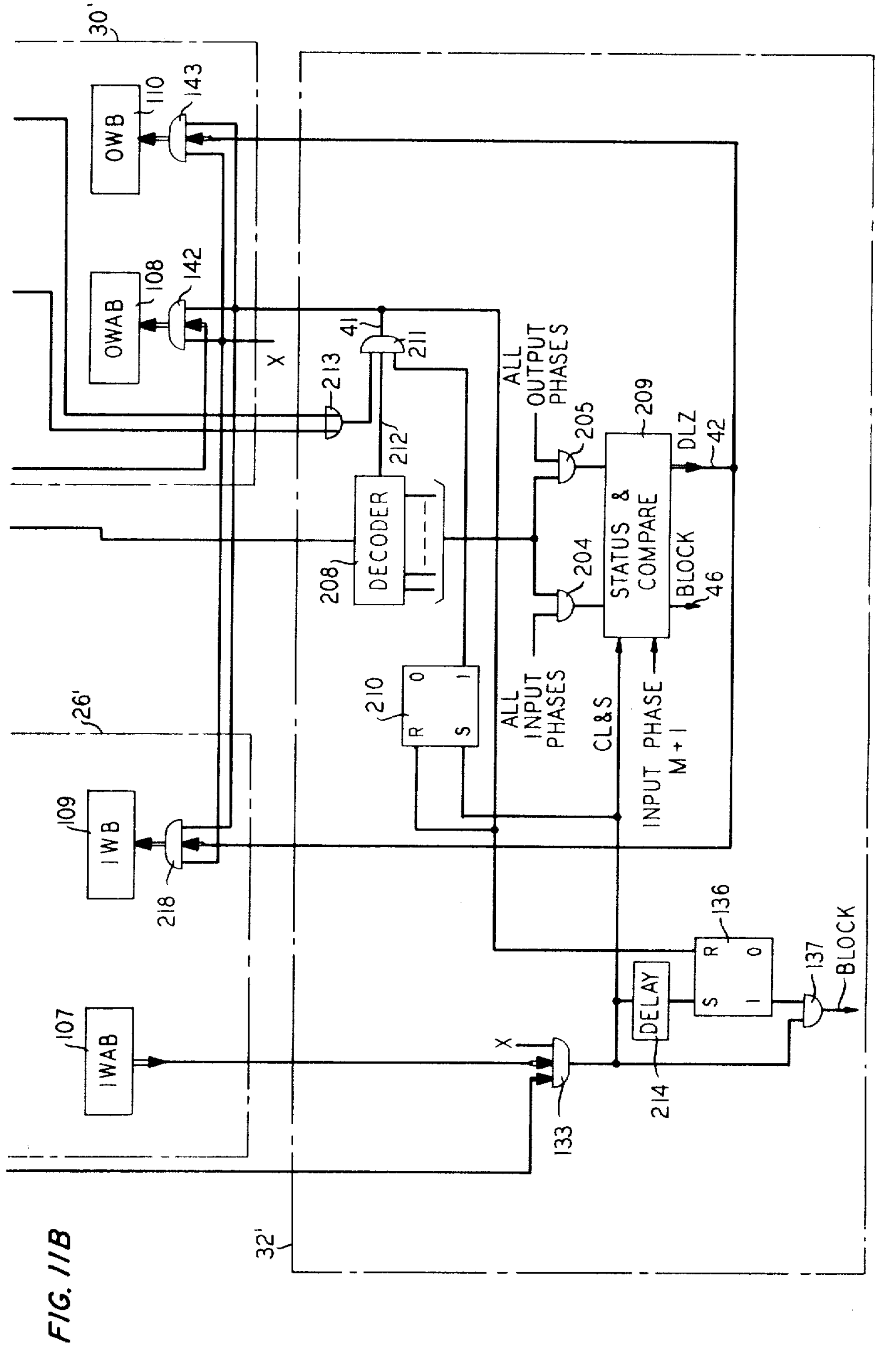

Pathfinding logic 32' in FIG. 11B operates in a fashion which is similar to that previously discussed for the pathfinding logic 32 in FIG. 7. In the case of the logic 32', however, a memory storage location decoder 208 receives continuously control memory output words at the output of OR-gate 187 and converts those words from their binary coded form into a 1-out-of-R form in which the location names are coupled to input connections of a status and compare logic circuit 209. Decoder 208 can be the previously mentioned decoder in memory 28'' but it is separately shown in pathfinding logic 32. The latter circuit includes two sets of bistable circuits corresponding to those of the status register 120 in FIG. 7 and the compare register 121 in FIG. 7, respectively; but in the circuit 209 of FIG. 11B those bistable circuits have no shifting capability within either register.

The status register in circuit 209 simply receives 1-out-of-R signals to set or reset its stages when time division message information is to be read into or out of, respectively, corresponding locations in memory 28''. A gate 204 is enabled during all input time slot phases to couple decoder outputs to setting inputs of the status register and a gate 205 is similarly enabled during output phases to couple decoder outputs to resetting inputs of the status register.

During the M+1 input phase of the time slot phase signals, the binary ONE outputs of the status register bistable circuits are coupled for setting the corresponding bistable circuits of the compare register in the same fashion that a similar status transfer was accomplished during time slot phase B in FIG. 7.

The compare register is cleared at the outset of a pathfinding operation by the clear and start signal, the same as in FIG.

7. Throughout the pathfinding operation the binary ZERO outputs of the compare register are examined by detect-low-ZERO logic in circuit 209 as was the case in FIG. 7; and similar output signals are provided to indicate a blocking condition by a signal on circuit 46, or the name of the low order stage on circuit 42. In the pathfinding logic 32' of FIG. 11B it is not necessary to compute the available input memory location name upon the occurrence of a first free output time slot as was done in FIG. 7 since memory 28'' is a static store and the input and output locations are always the same for any particular message.

In order to establish a time slot interchange connection for a call in FIGS. 11A and B, coincidence gate 133 identifies the time slot being used by the input time division line 12 as was done in FIG. 6. Similarly, the output of gate 133 is utilized by the block-detecting flip-flop 136, after one time slot of delay in a delay circuit 214, and by the block-indicating coincidence gate 137.

The same output also provides the clear and start signal for resetting the compare register in status and compare circuit 209. This time slot match signal is further utilized in FIG. 11B to set a flip-flop circuit 210 which provides at its binary ONE output a signal for enabling a coincidence gate 211. The latter gate also receives on a circuit 212 a further enabling signal each time decoder 208 detects an all-ZERO, or invalid, address word from a control memory. Finally, gate 211 receives an actuating signal from an OR-gate 213 which is responsive to the occurrence of a coincidence condition between an output time slot phase signal and a set condition for a line select flip-flop for a corresponding output control memory.

It will be recalled that when a calling party initiates a call and identifies the called party, central control 20 sets the line select flip-flop for the output time division line 17 which serves that called party. Thus, each time the output time slot phase signals look at the output of the control memory, e.g., memory 77'', serving that called party, the binary ONE output signal from the line select flip-flop circuit 106 for that memory actuates a coincidence gate 216 to couple an enabling signal through OR gate 213 to coincidence gate 211. If at that time the circuit 212 indicates an all-ZERO output from the control memory 77'', gate 211 is actuated to signal detection of the first free time slot on the called time division line.

The output signal from gate 211 is applied in multiple to coincidence gates 142 and 143 for loading output write address buffer 108 and output write buffer 110. The same enabling signal is also applied to a further coincidence gate 218 for loading input write buffer 109. All three of these gates 142, 143, and 218 are at the same time enabled by the X control signal from the command translator 91 in FIG. 5. Output write address buffer 108 at this time has the current time slot name loaded into it from the cable 182, and the input and output write buffers 109 and 110 have loaded into them the binary coded name of the low order ZERO stage in the compare register of status and compare circuit 209. Finally, the output signal from gate 211 is coupled back to reset the flip-flop circuits 136 for inhibiting a blocking signal and 210 for removing one enabling signal from the gate 211.

Next central control 20 issues the STORE command to cause the control memories for the calling and called lines to have loaded therein the contents of the input and output write buffers 109 and 110, respectively. At the same time the calling and called time slots are provided from the input and output write address buffers 107 and 108 as has been previously described. Thus, the connection for the call through the time slot interchanging random access memory 28'' is established and the pathfinding logic 32' is restored to its available condition for awaiting a new command from central control.

It may be useful at this point to observe that it has been known in the art to employ static delay storage for time slot interchanging functions. However, such storage has generally been employed for time slot interchange for a single time division multiplex line, and it has been so employed in systems where no more than a single line could be served because of the inherent hazard of overwriting message segments undergoing delay. To avoid that hazard, a full frame of storage locations was made separately available to each time division line. This necessitated a great deal of excess storage capacity and excess control memory capacity and associated circuitry. However, in the time slot interchanging embodiment utilizing static storage as shown in FIGS. 11A and B multiple time division multiplex lines are served by the single memory 28'' wherein any time slot unit storage location is available to any of the time division lines served in every time slot without danger of overwriting information undergoing delay operations.

Figure 12:
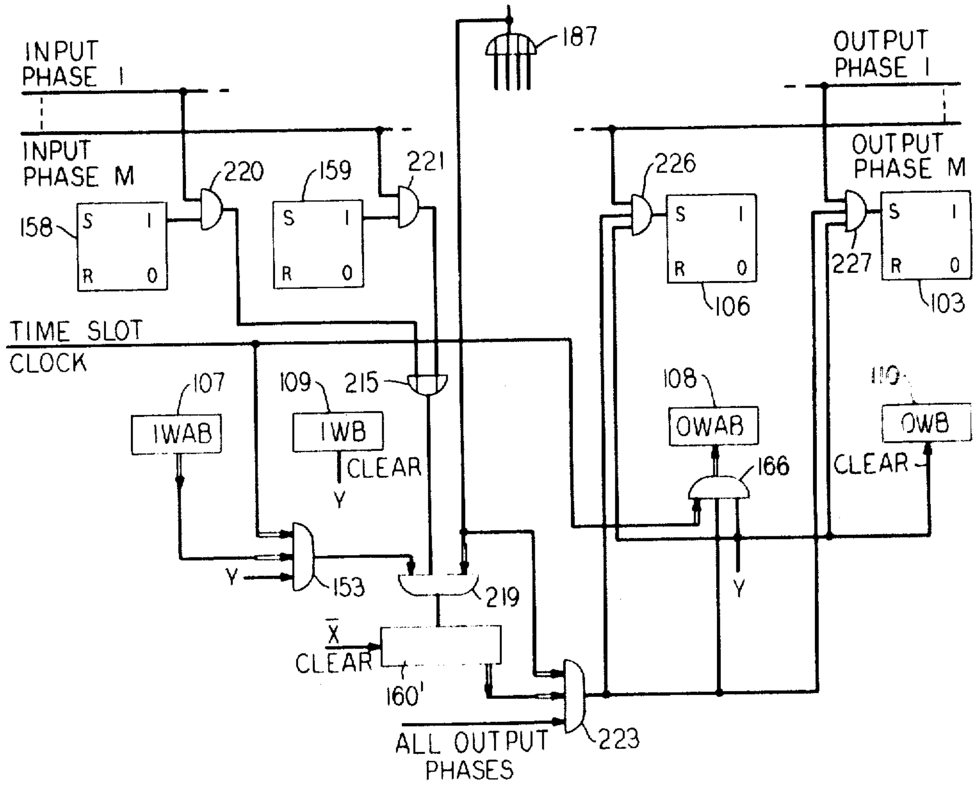
FIGS. 11A, 11B and 12 are diagrams of principal details of a further embodiment of the invention.

The circuits of FIG. 12 illustrate the disconnect search operation of pathfinding logic 32'. Here again circuit elements corresponding to those employed in other figures are designated by the same or similar reference characters. The function performed in FIG. 12 is similar to that performed in FIG. 9 but modified to accommodate the scanning type of operation for the system in FIGS. 11A and B.

Upon the issuance of the DISCONNECT SEARCH command, the Y control signal clears the input and output write buffers 109 and 110. Control memory readout words from the output of OR-gate 187 are applied to a coincidence gate 219 which is further enabled by the output of time slot signal matching gate 153. Since the line select flip-flop for the calling party's line is in the set state during the Y control signal, its binary ONE output is applied to a coincidence gate in conjunction with the input time slot phase signal for the same line. Thus, in FIG. 12 gates 220 and 221 perform such a coincidence function for line select flip-flop circuits 158 and 159. The output of the actuated one of these coincidence gates is coupled through an OR-gate 215 to provide a further enabling signal to the gate 219. Thus, upon the occurrence of a time slot match and the input time slot phase for the calling line, gate 219 is actuated to apply the binary coded readout of the calling line control memory to a register 160' corresponding to the incrementing register 160 of FIG. 9. In this case, however, the register 160' has no shifting capability, and it was cleared by the $\overline{X}$ control signal of the preceding disconnect search operation.

Subsequently, all output time slot phase signals are applied in sequence to a gate 223 which also receives the output of register 160' and the output of OR-gate 187. Upon the occurrence of a match between the outputs of the OR gate and of register 160', the appropriate location in memory 28'' is identified, and gate 223 is actuated. Output signal from this gate cooperates with the Y control signal for enabling gate 166 to couple the time slot name into the output write address buffer 108. The same signals cooperatively enable input coincidence gates, such as gates 226 and 227, for coupling respective output time slot phase signals for setting corresponding output line select flip-flops such as the flip-flop 103 and 106. During the time slot when gate 223 is actuated, the corresponding line select flip-flop which receives the same output time slot phase signal is set. Thereafter, upon the occurrence of a STORE command, the all-ZERO contents of the previously cleared input and output write buffers are stored in the input and output control memories for the calling and called lines, respectively, at the word locations designated by the input and output write address buffers. This takes down the time slot interchange connection for the call and a subsequent STOP command clears the command translator 91 so that the call connection is completely terminated. At that time the $\overline{X}$ signal once more clears the register 160'.

Having now reviewed the application of principles of the present invention to systems utilizing both dynamic and static time slot delay storage as embodied in the reentrant shift register 28' and the random access memory 28'', it will be apparent to those skilled in the art that other forms of dynamic or static delay storage can also be employed. For example, a delay storage 28 employing static memory in the form of an array of independent bistable circuits with no shifting capacity can be employed. Such an array is similar in some ways to the random access memory, but it is advantageously operable on a simultaneous full time slot access basis as in the case of the shift register embodiment rather than on a scan basis within a time slot as was used in the random access memory embodiments. Circuits are not specifically illustrated for the full time slot access static register form of the invention since they are essentially similar to those provided for the reentrant shift register embodiment with the omission of shifting input drive for the storage 28 and for the pathfinding logic 32 and the omission of interconnections between bistable circuits of any particular register in storage 28 and logic 32.

Figure 13A:
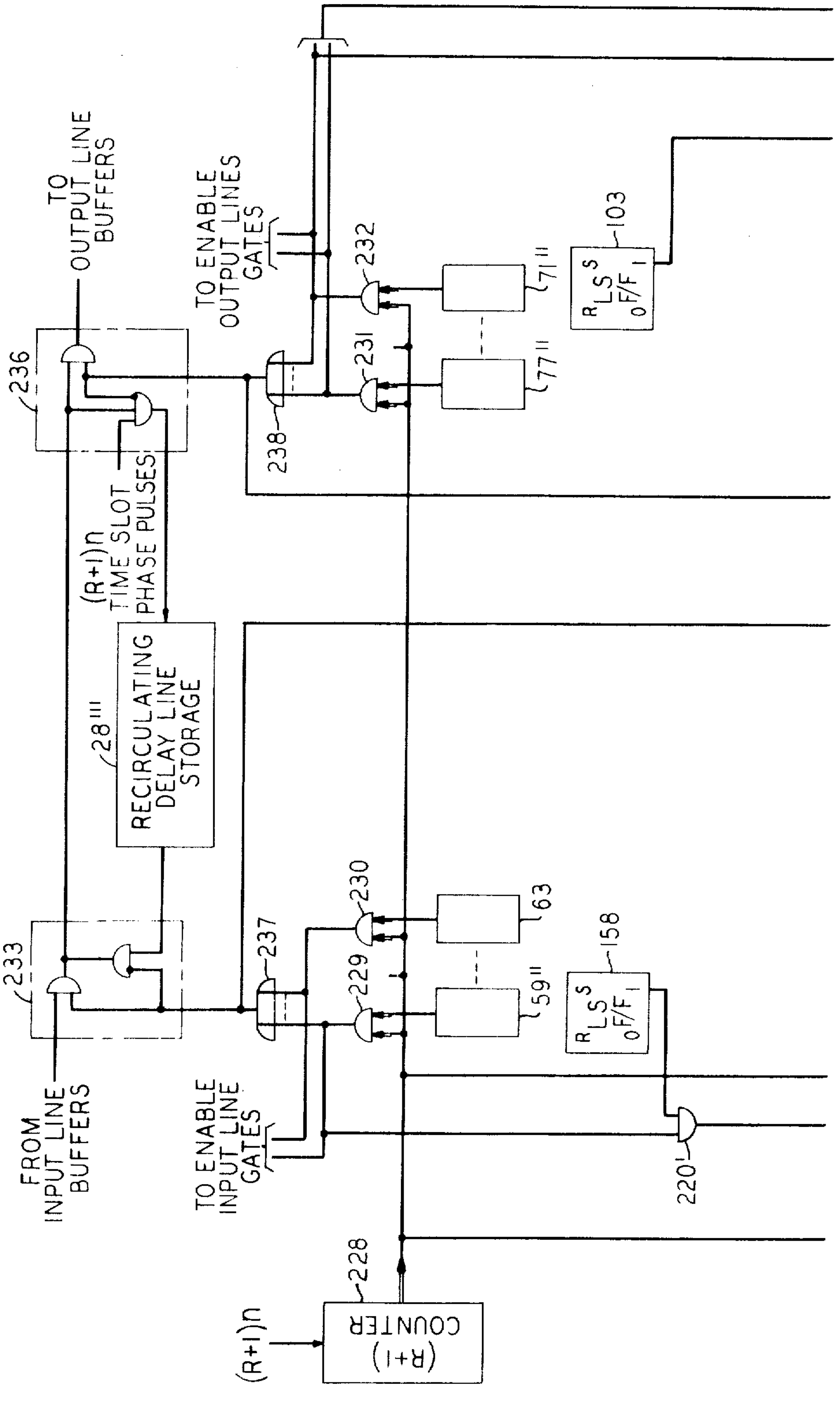
FIGS. 13A and 13B are partial diagrams of a still further embodiment of the invention.
Figure 13B:
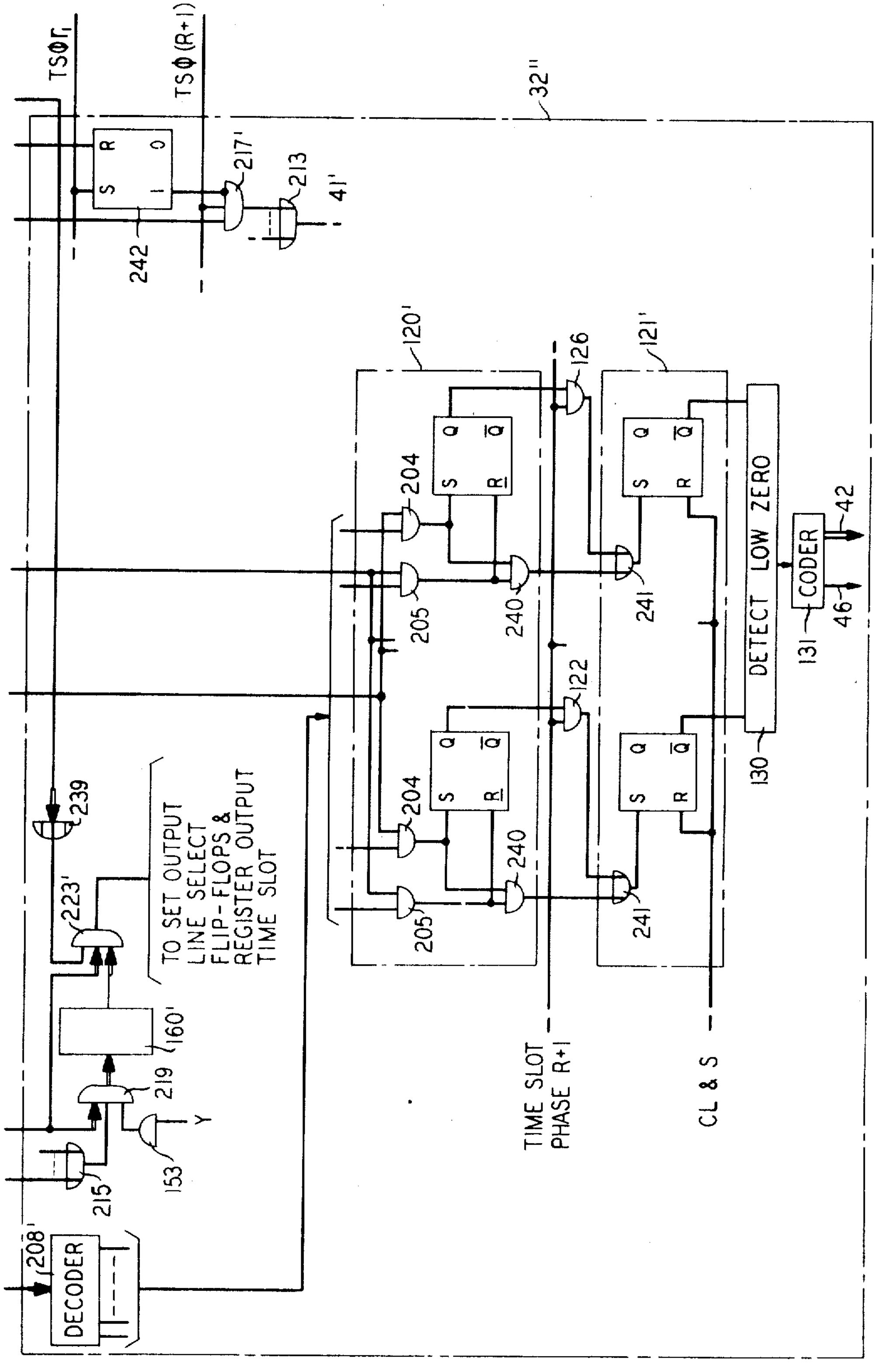

FIGS. 13A and B are together a partial diagram of another alternative form of storage utilizing the time slot scan access technique. Many diagram portions that are the same as or similar to portions in other embodiments have been omitted. This embodiment is one wherein the delay storage 28 utilizes a delay line 28''' having a number of storage locations corresponding to the number employed in either the reentrant shift register or the random access memory. This is a form of dynamic storage, and the locations in their fixed sequence are recirculated through the delay line in response to delay line drive signals occurring at the rate of $(R+1)n$ pulses where R+1 is the number of storage locations in the delay line and $n$ is the number of time slots per frame of time division signal transmission. Only R of the locations are used for storage as will be later described. The delay line embodiment is similar to the random access memory embodiment since both are operated in the scanning mode, and delay storage locations are accessed in their sequential position in the delay line.

Individual control memories are provided for the respective time division lines in the delay line embodiment, and word locations in each control memory are scanned at the time slot rate as in the previously described embodiments. Within each store a name of a delay line storage location to be used for the corresponding time division line in the particular time slot is stored in the time slot word location. However, in a delay line embodiment of R+1 storage locations a modulo-(R+1) counter 228 is advantageously employed and operated at the $(R+1)n$ rate. The binary code representation state of the counter outputs in each scan interval is compared to the binary output from each input and output control memory by coincidence gates such as gates 229–232. Upon the detection of a match, it is known that the delay storage location corresponding to the modulo-(R+1) counter state is then at the delay line input and output points and is to be accessed by the time division line corresponding to the control memory for which the match occurs. Accordingly, the line gate of that line is actuated, an an input control gate 233 to the delay line is opened to receive time division message information of time slot unit magnitude from the line buffer for that line if the match occurred at an input control memory. If the match occurred at an output control memory, then a corresponding output line buffer is enabled, and a delay line output gate 236 is opened to apply the contents of the corresponding delay line location to the line buffer for that output time division line. Gates 233 and 236 comprise known combinations of coincidence gates for allowing access to information in a circulating delay line, and the gates are opened and closed by control memory output match signals. Input and output lines have simultaneous time slot access to the delay storage, but on a scanning basis, at a rate somewhat higher than in the random access memory embodiment because R+1 is usually larger than 2M+1.

Pathfinding logic 32'' for the delay line embodiment is similar in many respects to that already described for the random access memory embodiment, but it operates at a somewhat faster rate than does the latter embodiment. In the pathfinding logic the outputs of the modulo-(R+1) counter are decoded to a 1-out-of-(R+1) basis by decoder 208' and utilized for coupling control memory match output signals from OR-gates 237 and 238 to corresponding stages of the status register 120' in status and compare logic 209. Match signals from input control memories are utilized by way of coincidence gates 204 to set such stages to which they are steered, and match signals from output control memories are utilized by way of coincidence gates 205 to reset those stages.

The stages of status register 120' are bistable circuits of the dominant reset type and which are not interconnected for shifting. Such bistable circuits have input connections designed to respond to separate set or reset input signals in the usual manner but to hold or assume the reset state if driven simultaneously by set and reset input signals. In the event of such coincidence in a stage of the register 120', the corresponding one of coincidence gates 240 is actuated to apply a signal through an OR-gate 241 to set a corresponding bistable circuit stage of compare register 121'. The stages of the latter register are conventional bistable circuits with no shift capability and which are simultaneously reset by the clear and start signal.

Information is transferred from the status register to the compare register at the time slot rate during time slot phase R+1 after all of the first R locations of delay line 28'' have been scanned. Such transfer sets any stages of compare register 121' corresponding to set stages of status register 120'.

A free output time slot is located in FIGS. 13A and B in a somewhat different manner than in other embodiments. A set flip-flops, including the single illustrated flip-flop 242, is associated with respective output control memories. All of the flip-flops 242 are set in the initial phase $TS\phi r_1$ of each time slot; and in that same phase and subsequent phases the respective flip-flops 242 are reset anytime the match gate, e.g., gate 232, of the corresponding control memory is actuated. For each output control memory the binary ONE outputs of its line select flip-flop, e.g., flip-flop 103 for memory 71'', and of its additional flip-flop 242 are applied to coincidence gate 217' for the memory. The gates 217' are enabled in the final phase $TS\phi(R+1)$ of each time slot, and the output of any activated gate 217' is applied through OR-gate 213 to circuit 41' because such gate represents the selected output line and shows that such line had no memory output matching in the time slot. Otherwise the connect search function for the pathfinding logic operates substantially the same as that described for the random access memory embodiment of FIGS. 11A and B.

During a disconnect search operation in a delay line embodiment, the pathfinding logic also operates in a manner similar to that already described for the random access memory embodiment. Thus, a match between the calling line time slot and the time slot clock at gate 153 is determined; and upon coincidence at gate 219 of that condition with actuation of an (R+1)-count match gate, e.g., 229, at the output of the calling line control memory 59'', the contents of the R counter 228 are loaded into register 160'. That register has no incrementing function. Match gate outputs from lines having the line select flip-flop set are the only ones used at gate 219 as determined, for example, for memory 59'' by coincidence gate 220' which has its output coupled through OR-gate 215 to gate 219. This initial information loaded into the register 160' is the name of the delay line storage location which is used for the call to be disconnected, and that information must be employed to identify the output time division line and time slot. For the latter purpose, each time the modulo-(R+1) counter 228 goes through the state corresponding to the contents of register 160', gate 223' looks at the output of an OR-gate 239 for output control memory match signals to find one, e.g., from memory 71'', which has its (R+1)-match gate actuated. Upon occurrence of such a match, the output of gate 223' is used in coincidence with the (R+1)-match gate output of such memory to set the line select flip-flop for that output control memory in the same fashion that time slot phase signals were used in coincidence with gate 223 output in FIG. 12. Thereafter the then current time slot name is registered in the output write address buffer. Upon the occurrence of the next STORE command the previously cleared contents of the input and output write buffers are stored in the selected control memories at the time slot word locations identified at the input and output write address buffers.

Figure 14:
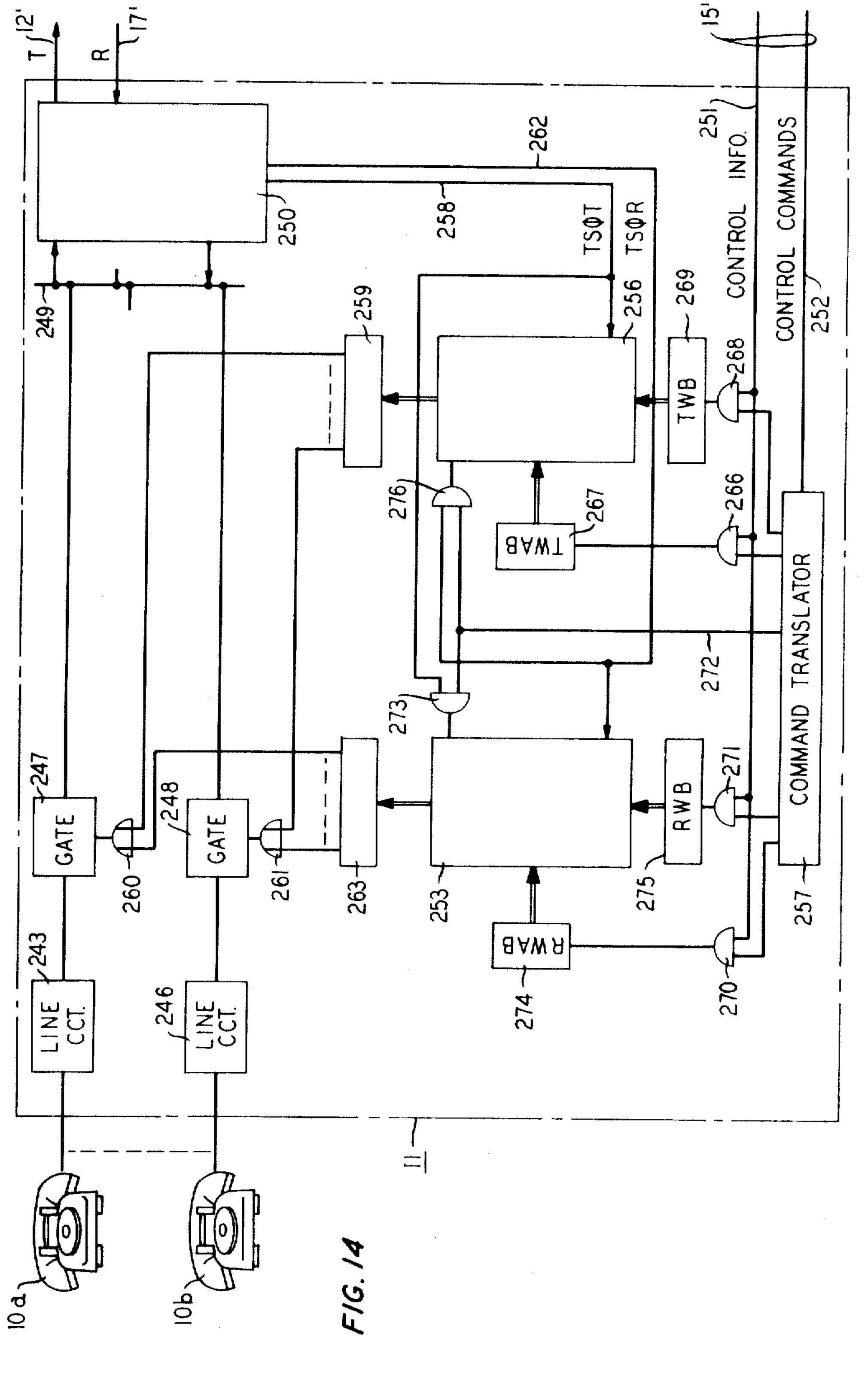
FIG. 14 is a diagram of a line concentrator for use in the system of FIG. 1.

FIG. 14 depicts additional details of one form of the line concentrators shown in FIG. 1 and which is advantageously employed in that system to avoid the restriction that a subscriber must talk and listen in different phases of the same time slot. For convenience of reference, the concentrator in FIG. 14 is shown as the concentrator 11. This modified concentrator is similar in many respects to the concentrator employed in the D. B. James et al. U.S. Pat. No. 2,957,959; and specific reference is made to the simplified diagram of that concentrator in FIG. 2 of the patent. Other concentrators could be similarly modified. Subscribers 10*a* and 10*b* are coupled through line circuits 243 and 246, respectively, and bidirectional line gates 247 and 248, respectively, to a common transmission bus 249. A time division hybrid circuit 250 couples the bus 249 to a transmitting time division line 12' and a receiving time division line 17'. The hybrid 250 performs various timing, signal preparation, and encoding and decoding operations for converting the subscriber analog signals into pulse code modulated time division multiplex signals and vice versa as taught by James et al. Line circuits 243 and 246 are employed for line scanning as controlled by the hybrid 250 and by control signals supplied in the control circuit bus 15' from central control 20 in FIG. 1. Connections for exercising that control are, however, not depicted in FIG. 14.

Circuits 251 and 252 in the bus 15 provide control information signals and control command signals, respectively, from central control. Such signals are advantageously provided in a bit sequential manner but other forms of transmission may be utilized as is well known in the art. The control information signals determine the contents of two control memories 253, for receiving, and 256, for transmitting, in a manner which will subsequently be described in greater detail, but which is similar to that described for FIG. 5. Control common signals on the circuit 252 are operated upon by a command translator 257 which includes code translating logic and additional fanout logic for controlling access to the memories 253 and 256 in a fashion to be described and which is somewhat similar to the operation of the command translator 91 in FIG. 5. Details of translator 257 are not shown because they are of a well-known type and are not part of the invention.

In the system taught in the James et al. patent any subscriber engaged in a call transmits and receives in different phases of a time slot assigned to that cell. Such an arrangement is somewhat restrictive, particularly where time slot interchange is to be employed because it means that every call requires a full frame of delay to accommodate both transmitting and receiving. Thus, during transmission there is the usual time slot delay between calling and called time slots; and the frame-complementary time slot delay between called and calling time slots is used for the opposite direction of transmission. For example, if outgoing transmission requires a time slot delay from the third to the tenth time slots of a frame, the return path must utilize a complementary time slot delay from the tenth time slot of a first frame to the third time slot in the next succeeding frame. Thus, a full frame of delay is consumed.

For FIG. 14 the modified line concentrator treats the transmit and receive functions separately. Thus, where the outgoing portion of a call may utilize a time slot delay between the third and 10 the time slots the time slot delay established for the return portion of the call connection from the called to the calling parties is independently determined and may employ an unrelated time slot delay, e.g., between only the second and seventh time slots. Thus, such a call would require a total delay of 14 time slots instead of the 24 time slots that are necessary in the prior art.

The transmit control memory 256 is scanned by time slot clock signals during time slot transmit phases in response to read enable signals provided on a circuit 258 from a concentrator control in the hybrid 250. These signals appear during the transmit phase of each time slot and are employed in conjunction with time slot clock signals provided by connections, not shown, from the same hybrid to read out in the memory word location sequence the names of the line gates such as gates 247 and 248 for subscribers then involved in active calls. The output signals from memory 256 are applied through a decoder 259 and OR-gates 260 and 261 to operate the bidirectional line gates on a selective basis. In a similar manner time slot phase signals during the receiving phase of each time slot are applied on a circuit 262 for enabling scanning readout of receive control memory 253 through its decoder 263 to the gates 260 and 261. It should perhaps be noted at this point that the transmit and receive time slot phases utilized in the concentrator represent a time partitioning of the time slots on a different basis than that which was previously discussed for providing time slot phase signals utilized in the office 13 and particularly in the pathfinding logic 32.

It can be seen from what has already been stated in regard to the control memories 253 and 256 that they operate and are accessed in a fashion which is similar to that described for the control memory in FIG. 5. This also holds true for the operation of storing particular information in the control memories as provided from central control 20 by way of the control bus 15. Translator 257 provides the necessary code translation and fanout energy for distributing control signals to all of the places where required. In addition the translator 257 provides interlock connections to avoid conflict among commands as was indicated in connection with the translator 91. Once central control has identified the calling time slot and the line gate number of the line gate, e.g., 247, being used by the calling party, that information is supplied to the appropriate concentrator on its control information circuit 251 while necessary control commands are supplied on circuit 252. Translator 257 produces a transmit control signal to enable a gate 266 to couple the transmitting time slot name from circuit 251 to the transmitting memory write address buffer 267. Thereafter a transmit address control signal enables a gate 268 to couple the transmitting line gate number for the call to the transmitting memory write buffer 269. Similarly translator 257 supplies control signals for enabling gates 270 and 271 to couple the receiving time slot name and line gate number to the receiving write address buffer 274 and write buffer 275, respectively, when such information has been determined by the office 13. A store control signal on a circuit 272 enables gates 273 and 276, and thereafter during the receive time slot phase gate 276 is actuated to enable the transmitting memory 256 to be loaded from its buffers, and during the transmit phase gate 273 is actuated to enable the receive memory 253 to be loaded from its buffers. Subsequently the STOP command from central control clears the translator 257. If subscriber 10*a* was the calling subscriber for the call connections just loaded in the control memories of FIG. 14, those memories now contain information representing the bidirectional line gate 247 in the transmitting memory word location corresponding to the time slot to be used for transmission by subscriber 10*a* and in the receiving memory word location corresponding to the time slot to be used by subscriber 10*a* for receiving signals from the called party. The two time slots will usually be different.

The use of concentrators of the type shown in FIG. 14 lends to the office 13 in FIG. 1 a broad flexibility on the utilization of available time slots on the various incoming and outgoing time division lines. Consequently, opportunities are available to minimize time slot interchange delays and thereby reduce blocking probability for any given time slot delay storage capacity. The present invention is operable and useful in prior art systems wherein a subscriber is required to utilize the same time slot for both sending and receiving, but the advantages realized are less because a greater amount of time slot delay storage capacity is required.

Although the present invention has been described in connection with particular embodiments thereof, it is to be understood that additional embodiments, modifications, and applications of the invention, which will be obvious to those skilled in the art, are included within the spirit and scope of this invention.

What is claimed is:

1. In combination
a plurality of space-divided input signal channels for supplying respective time division multiplex pulse trains each representing a plurality of different signal messages,
memory means having a plurality of memory locations for storing a plurality of information signals, each location having storage capacity for only as much signal as is received from a channel in one time slot,
input means for selectively coupling any of said channels to respective inputs of different ones of said locations during each time division multiplex time slot and with substantially the same time slot delay imparted to all channels between a channel and a location coupled thereto,
a plurality of output time division multiplex space-divided signal channels for receiving time division multiplex signals from said locations,
output means for selectively coupling outputs of any of said locations to different ones of said output channels during each time division multiplex time slot and with substantially the same time slot delay imparted to all channels between a channel and a location coupled thereto, and
means cooperatively controlling said input and output selective coupling means for time slot interchange coupling between said input and output channels for respective messages in said trains.

2. The combination in accordance with claim 1 in which the number of said storage locations is approximately three times the number of said input lines for offered traffic level in said input and output lines of about 0.5 erlang per time slot for a channel.

3. The combination in accordance with claim 1 in which said controlling means includes means for simultaneously actuating in each time slot all of said input coupling means for channels having message signals during such time slot and simultaneously actuating in each time slot all of said output coupling means for channels to receive message signals during such time slot.

4. The combination in accordance with claim 1 in which said memory means comprises
a random access memory wherein each storage location is a different one of said memory locations.

5. The combination in accordance with claim 1 in which said controlling means comprises
means, responsive to message termination on time slot interchange coupled input and output channels for identifying said channels and respective time slots utilized for such message, and
means for terminating operation of said controlling means for said input and output channels in such time slots.

6. The combination in accordance with claim 1 in which said memory means, input and output signal channels, and input and output coupling means comprise a first set of time slot interchanging apparatus,
at least one additional set of time slot interchanging apparatus of the same type as said first set is connected for tandem operation with said first set, wherein one of said output channels of said first set is a time division multiplex link connected to an input channel of said additional set, and
said controlling means includes means for controlling said sets of said time slot interchange apparatus to establish said time slot interchange coupling in said first set and thereafter in said additional set for establishing time slot interchange coupling among selected channels served by said sets.

7. The combination in accordance with claim 1 in which said memory means comprises
a circulating delay line memory wherein each storage location is a different one of said memory locations, and
means for completely circulating said locations through said memory once during each time slot.

8. The combination in accordance with claim 1 in which each of said memory means locations comprises a bistable storage element having set and reset input connections, and
said input coupling means comprises a space division selective switching matrix having
a first set of rails connected respectively to said input channels and having a second set of rails connected respectively to said input connections of a different one of said storage elements, and
gating means operable by said controlling means for interconnecting any rail of said first set to any one of said storage elements, said gating means comprising means for converting single-rail logic signals on rails of said first set to double-rail logic signals on rails of said second set.

9. The combination in accordance with claim 1 in which said controlling means comprises
means for identifying calling and called time slots on an input calling line and an output called line, respectively, and
means for determining an available time-storage domain sequence among said locations and between said calling and called time slots.

10. The combination in accordance with claim 9 in which said determining means comprises
means for determining storage location availability of said locations starting from the time of said calling time slot,
means responsive to identification of said called time slot, for halting operation of said availability determining means, and
means for registering said location availability from said availability determining means.

11. The combination in accordance with claim 1 in which said memory means comprises
a shift register wherein each stage is a different one of said locations.

12. The combination in accordance with claim 11 in which said shift register is provided with a reentrant connection between the output of the last stage and the input of the first stage to form a closed shift register loop.

13. The combination in accordance with claim 1 in which said controlling means includes means for actuating in an input sequence in each time slot all of said input coupling means for channels having message signals during such time slot and actuating in an output sequence all of said output coupling means for channels to receive message signals during such time slot.

14. The combination in accordance with claim 13 in which each of said time slots is subdivided into first and second parts,
said input coupling sequence and said output coupling sequence occur in completely different parts of such time slot, and
said memory means are provided with a common input connection time shared in said input sequence by said input coupling means and a common output connection which is time shared by said output coupling means during said output sequence.

15. The combination in accordance with claim 1 in which said controlling means comprises
means for detecting, for a particular message, a time-location sequence that is available for message transmission coupling and includes available time slots on input and output channels to be interconnected, for a particular message, and
means for connecting such input channels to a location and in a time slot defining the start of said sequence and connecting such output channel to a location and in a time slot defining the end of that sequence in every frame of one of said trains including said particular message.

16. The combination in accordance with claim 15 in which said locations are assigned a predetermined sequential relationship to one another, and
said detecting means comprises means for identifying for said connecting means only the time-location sequence having the input location of lowest order, among input locations of any available time-location sequence, in said sequential relationship.

17. The combination in accordance with claim 15 in which said detecting means includes means for detecting an output channel available time slot the least time spread with respect to the input channel time slot.

18. The combination in accordance with claim 15 in which said detecting means comprises
means for indicating an available calling time slot on an incoming channel,
means for indicating an available time slot on a called outgoing channel,
means, operative in each time slot, for registering the availability, or unavailability, for message transmission status of each of said locations,
means, operative in each time slot, for registering changes in said status, and
means for indicating, in response to said status change registering means a portion of said locations that is available during and between said calling and called time slots.

19. The combination in accordance with claim 15 in which said detecting means comprises
means for indicating an available calling time slot on an incoming channel,
means for indicating an available time slot on a called outgoing channel,
means, operative in each time slot, for registering the availability, or unavailability, for message transmission status of each of said locations,
means operative in each time slot, for registering changes in said status, and
means for indicating in response to said status change registering means one of said locations that is available during and between said calling and called time slots.

20. The combination in accordance with claim 1 in which said controlling means comprises
a control memory for each of said channels and each control memory has a word storage location for each time slot of a frame of time division signal transmission,
means for storing in said word locations the names of memory means locations to be coupled to respective ones of said channels during time slots corresponding to said word locations, and
means, operative during each time slot, for reading out a different one of said word locations in each of said control memories so that each control memory reads out one word location in each time slot and all control memories are fully read out during a time division frame.

21. The combination in accordance with claim 20 in which said controlling means includes means for applying outputs of all of said control memories to operate said input coupling means simultaneously and to operate said output coupling means simultaneously.

22. The combination in accordance with claim 20 in which said controlling means includes
means for scanning outputs of all of said control memories in sequence once during each time slot, and
means for actuating one of said coupling means for coupling a channel corresponding to the control memory being read out to a memory means location named in the readout.

23. The combination in accordance with claim 20 in which said controlling means includes
means for accessing said memory means locations in a fixed sequence at a rate $(R+1)\ n$ where $R+1$ is the number of such locations and $n$ is the number of time slots per frame of time division signal transmission in one of said trains,
means for comparing memory means location names read out of said control memories with the name of the memory means location then being accessed and producing a match signal when they are the same, and
means responsive to said match signal actuating one of said coupling means for coupling a channel, corresponding to the control memory from which the match signal was produced, to the memory means location then being accessed.

24. The combination in accordance with claim 1 in which said controlling means comprises
means for separately establishing tie slot interchange coupling in each direction between said input and output channels for any given one of said messages, said coupling for each such direction being independent in a time sense of the coupling in the other direction.

25. The combination in accordance with claim 24 in which
each time slot for time division message signal transmission has transmit and receive time slot phases on each of said channels, and
said establishing means comprises
means for establishing an outgoing time slot interchange coupling from an input to an output channel in any one or more of the time slots of a frame of time division message signal transmission, and
means for establishing a return time slot interchange coupling from such output channel to such input channel in any one or more of said time slots of a frame, such return time slots being the same as or different from the outgoing time slots.

26. The combination in accordance with claim 1 in which
a plurality of signal lines are provided for transmitting and receiving signals when active,
line concentrators are provided for coupling signals on a time division multiplex basis between said channels and active one of said lines, and
each of said concentrators includes means for separately determining transmit time slots and receive time slots for active one of said lines coupled thereto.

* * * * *